(12) United States Patent
Urushidani

(10) Patent No.: US 10,015,367 B2
(45) Date of Patent: Jul. 3, 2018

(54) COLOR MEASUREMENT DEVICE AND PRINTING APPARATUS

(71) Applicant: Seiko Epson Corporation, Tokyo (JP)

(72) Inventor: Tatsuo Urushidani, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/259,203

(22) Filed: Sep. 8, 2016

(65) Prior Publication Data

US 2017/0078531 A1   Mar. 16, 2017

(30) Foreign Application Priority Data

Sep. 11, 2015  (JP) ................ 2015-179715

(51) Int. Cl.
*H04N 1/60* (2006.01)
*H04N 1/56* (2006.01)

(52) U.S. Cl.
CPC ......... *H04N 1/6044* (2013.01); *H04N 1/6094* (2013.01)

(58) Field of Classification Search
None
See application file for complete search history.

(56) References Cited

U.S. PATENT DOCUMENTS

| 5,068,810 | A | * | 11/1991 | Ott | B41F 33/0045 |
| | | | | | 101/211 |
| 5,818,605 | A | * | 10/1998 | Crewe | B41C 1/045 |
| | | | | | 358/3.29 |
| 6,404,511 | B1 | * | 6/2002 | Lin | H04N 1/6027 |
| | | | | | 358/1.9 |
| 6,585,340 | B1 | * | 7/2003 | Borrell | B41J 2/17546 |
| | | | | | 347/14 |
| 6,975,418 | B1 | * | 12/2005 | Ohta | H04N 1/00002 |
| | | | | | 358/1.15 |
| 7,486,414 | B2 | * | 2/2009 | Arai | G03G 15/5062 |
| | | | | | 358/1.9 |
| 8,922,854 | B2 | * | 12/2014 | Hyoki | H04N 1/04 |
| | | | | | 358/1.9 |
| 8,970,931 | B2 | * | 3/2015 | Kitai | H04N 1/00023 |
| | | | | | 358/1.9 |
| 9,163,989 | B2 | * | 10/2015 | Mikuriya | B41J 29/02 |
| 9,387,703 | B2 | * | 7/2016 | Mizutani | B41J 2/125 |
| 9,674,401 | B2 | * | 6/2017 | Kojima | H04N 1/60 |
| 2001/0022848 | A1 | * | 9/2001 | Rhoads | G06K 9/00442 |
| | | | | | 382/100 |
| 2002/0011567 | A1 | * | 1/2002 | Ozanich | G01J 3/02 |
| | | | | | 250/326 |

(Continued)

FOREIGN PATENT DOCUMENTS

| JP | 2013-130561 A | 7/2013 |
| JP | 2014-082679 A | 5/2014 |

*Primary Examiner* — Madelein Nguyen
(74) *Attorney, Agent, or Firm* — Harness, Dickey & Pierce, P.L.C.

(57) ABSTRACT

A printer includes a calibration reference object, which includes a calibration surface for performing calibration of a color measurement machine that performs color measurement of media, and a pressing force plate that determines a relative position of a media surface of the media and the calibration surface so that the media surface of the media and the calibration surface have a predetermined positional relationship.

20 Claims, 17 Drawing Sheets

(56) References Cited

U.S. PATENT DOCUMENTS

| | | | | |
|---|---|---|---|---|
| 2004/0041078 | A1* | 3/2004 | Wolber | H04N 1/00002 250/208.1 |
| 2005/0083540 | A1* | 4/2005 | Hersch | H04N 1/6025 358/1.9 |
| 2005/0237548 | A1* | 10/2005 | Suzuki | H04N 1/00015 358/1.9 |
| 2005/0265597 | A1* | 12/2005 | Ono | G06K 15/02 382/162 |
| 2005/0270321 | A1* | 12/2005 | Ono | H04N 1/6033 347/14 |
| 2006/0023272 | A1* | 2/2006 | Tezuka | H04N 1/6033 358/518 |
| 2007/0013964 | A1* | 1/2007 | Ono | B41J 29/393 358/406 |
| 2007/0024928 | A1* | 2/2007 | Ono | H04N 1/6033 358/504 |
| 2007/0030525 | A1* | 2/2007 | Ono | H04N 1/6033 358/406 |
| 2008/0013128 | A1* | 1/2008 | Baker | G01J 3/50 358/296 |
| 2008/0225075 | A1* | 9/2008 | Nishizaka | B41J 11/003 347/19 |
| 2009/0027433 | A1* | 1/2009 | Van De Wynckel | B41J 2/2135 347/12 |
| 2009/0059297 | A1* | 3/2009 | Uemura | G03F 9/7003 358/1.18 |
| 2009/0225341 | A1* | 9/2009 | Matsuzawa | G01J 3/52 358/1.9 |
| 2009/0231374 | A1* | 9/2009 | Van De Wynckel | B41J 2/2135 347/12 |
| 2010/0171971 | A1* | 7/2010 | Hoshii | H04N 1/6033 358/1.9 |
| 2011/0249116 | A1* | 10/2011 | Yamagishi | G01J 3/465 348/135 |
| 2012/0218574 | A1* | 8/2012 | Fukuda | H04N 1/6033 358/1.9 |
| 2013/0016164 | A1* | 1/2013 | Usuda | H04N 1/6044 347/102 |
| 2013/0021620 | A1* | 1/2013 | Doi | G06K 15/027 358/1.2 |
| 2015/0015923 | A1* | 1/2015 | Hayashi | H04N 1/6033 358/474 |
| 2015/0296189 | A1* | 10/2015 | Yu | G01J 3/513 348/266 |

* cited by examiner

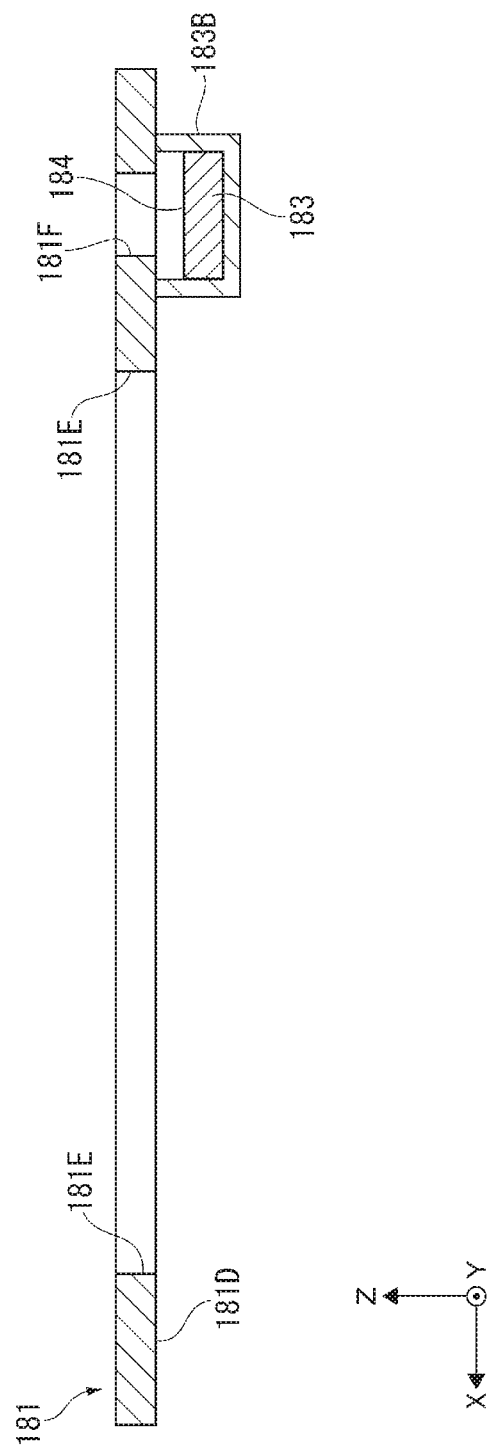

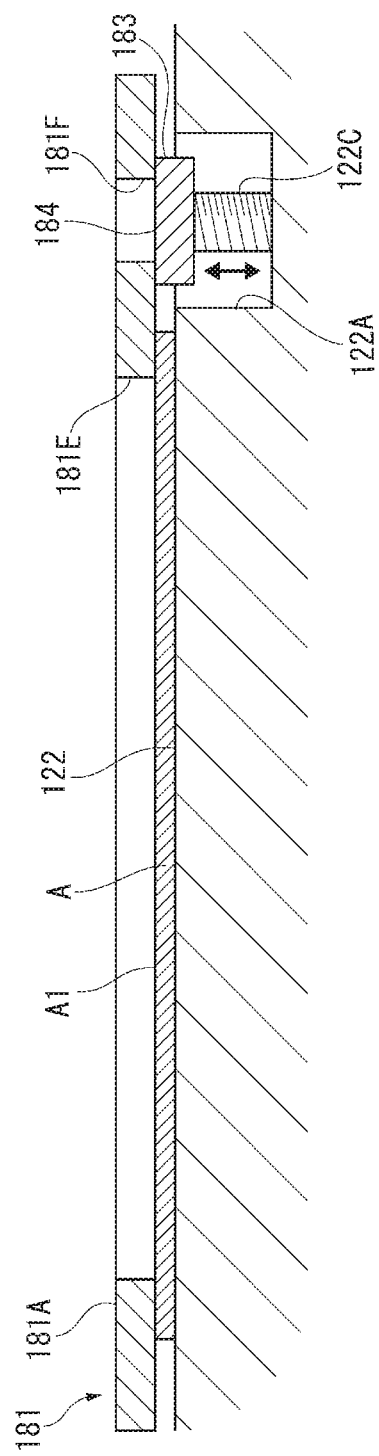

COLOR MEASUREMENT DEVICE AND PRINTING APPARATUS

BACKGROUND

1. Technical Field

The present invention relates to a color measurement device and a printing apparatus.

2. Related Art

In the related art, a printing apparatus in which a color measurement machine, which performs color measurement of printed images, is provided, is known (for example, refer to JP-A-2014-82679).

The printing apparatus (an image forming apparatus) that is disclosed in JP-A-2014-82679 transports a paper surface for recording, on which a test chart is formed using an image formation unit, on a guide plate, reads the test chart using a spectroscopic color measurement machine of a reading unit, and implements a calibration process on the basis of the result. At this time, it is possible to improve color measurement accuracy with respect to the test chart by reading a calibration reference member using the spectroscopic color measurement machine, and using a measurement result (a calibration reference value). Further, in the printing apparatus, during reading of the calibration reference object by the spectroscopic color measurement machine, the position of an upper surface (a calibration surface) of a calibration reference object is determined (refer to FIG. 4B in JP-A-2014-82679) as the same position as an upper surface of the guide plate by elevating and lowering the calibration reference member.

Given that, in the printing apparatus of JPA-2014-82679, the position of the upper surface (a calibration surface) of a calibration reference member is determined so as to be the same position as that of the upper surface of a guide plate. However, since a thickness dimension differs depending on the type of media, a gap (a difference in height) between the upper surface and the calibration surface of the media is also a value that differs. Therefore, when a color measurement result of media is corrected using a color measurement result of a calibration reference member, there is a problem in that respective color measurement conditions differ depending on the type of media, and it is not possible to obtain a correct color measurement result. For example, in a case in which a color measurement process is performed for a first media and a second media respectively having different thickness dimensions, a difference in height between the upper surface and the calibration surface of the first media and a difference in height between the upper surface and the calibration surface of the second media respectively have different values. Therefore, even supposing the same test pattern is formed on the upper surface of the first media and the upper surface of the second media, there are cases in which respectively different measurement results are output due to the influence of these differences in height.

SUMMARY

An advantage of some aspects of the invention is to provide a color measurement device and a printing apparatus that are capable of acquiring a color measurement result with high accuracy.

According to this application example, there is provided a color measurement device including a calibration reference object, which includes a calibration surface for performing calibration of a color measurement machine that performs color measurement of media, and a position determination section that determines a relative position of one surface of the media and the calibration surface so that the one surface of the media and the calibration surface have a predetermined positional relationship.

According to the application example, the relative positions of the one surface of the media and the calibration surface are determined by the position determination section so that the one surface of the media and calibration surface have a predetermined positional relationship. In such a configuration, the one surface of the media and the calibration surface are maintained in the predetermined positional relationship without change even in a case of the media being exchanged with a type of media having a different thickness dimension. Therefore, when spectroscopic measurement is implemented using a color measurement machine, a difference (a difference in height) between the distance between the color measurement machine and the calibration surface when performing color measurement of the calibration surface, and the distance between the color measurement machine and the one surface of the media when performing color measurement of the media, does not change. Accordingly, color measurement results do not change depending on the type of media, and it is possible to implement a color measurement process having high accuracy.

In the color measurement device according to the application example, it is preferable that the position determination section is provided with an abutting member that includes an abutting surface, which abuts against the one surface of the media.

According to the application example, the position determination section is provided with an abutting member that abuts against the one surface of the media. In such a configuration, as a result of the position of the calibration surface of the calibration reference object being determined as a predetermined position with respect to the abutting surface, it is possible to easily determine the relative positions of the calibration surface and the one surface of the media as a predetermined positional relationship as long as the abutting surface is abutting against the one surface of the media.

In the color measurement device according to the application example, it is preferable that the abutting member applies a pressing force to the one surface of the media.

According to the application example, as a result of a pressing force being applied to the one surface of the media by the abutting member, it is possible to reliably align the one surface of the media and an abutting surface of the abutting member to the same planar surface (a position having the same height) or substantially the same planar surface. Accordingly, in the abovementioned manner, as a result of the position of the calibration surface of the calibration reference object being determined as a predetermined position with respect to the abutting surface, it is possible to determine the relative positions of the calibration surface and the one surface of the media as a predetermined positional relationship both easily and reliably.

In the color measurement device according to the application example, it is preferable that the calibration reference object is connected to the abutting member.

According to the application example, the calibration reference object is connected to the abutting member. Accordingly, in the abovementioned manner, it is possible to determine the position of the calibration surface as a predetermined position with respect to the abutting surface. As a result of this, in the abovementioned manner, as a result of causing the one surface of the media to abut against the abutting surface, it is possible to determine the positions of the one surface of the media and the calibration surface with a predetermined positional relationship.

In the color measurement device according to the application example, it is preferable that the calibration reference object is connected to a position in which the calibration surface and the abutting surface are on the same planar surface.

According to the application example, the calibration surface and the abutting surface are on the same planar surface. Accordingly, as a result of causing the abutting surface to abut against the one surface of the media, the positions of one surface of the media and the calibration surface are determined on the same planar surface. Accordingly, a color measurement distance (a distance from the color measurement machine up to a measurement target) when implementing color measurement of the one surface of the media using the color measurement machine, and a color measurement distance when implementing color measurement of the calibration surface using the color measurement machine, are the same distance. In other words, since it is possible to perform spectroscopic measurement of the one surface of the media and spectroscopic measurement of the calibration surface with the same measurement conditions, it is possible to implement spectroscopic measurement having even higher accuracy.

In the color measurement device according to the application example, it is preferable that a portion of the calibration surface abuts against the abutting surface.

According to the application example, a portion of the calibration surface abuts against the abutting surface. In such as configuration, as a result of the calibration surface and the abutting surface reliably being on the same planar surface (at positions having the same height), and causing the abutting surface to abut against the one surface of the media, the positions of the one surface of the media and the calibration surface are also determined on the same planar surface. Accordingly, in the same manner as the above-mentioned application example, it is possible to perform spectroscopic measurement of the one surface of the media and spectroscopic measurement of the calibration surface with the same measurement conditions, and therefore, it is possible to implement spectroscopic measurement having high accuracy.

It is preferable that the color measurement device according to the application example further includes a support member that retains the media.

According to the application example, the media is retained by the support member. Therefore, it is possible to suppress rolling, wrinkling and the like of the outer surface of the media, and therefore, it is possible to improve the color measurement accuracy.

In the color measurement device according to the application example, it is preferable that the support member includes an accommodation portion, which accommodates the calibration reference object, and that the calibration reference object is accommodated in the accommodation portion when the abutting surface is positioned in an abutting position in which the abutting surface abuts against the one surface of the media.

According to the application example, when the abutting surface of the abutting member is positioned in the abutting position in which the abutting surface abuts against the one surface of the media, the calibration reference object is accommodated in the accommodation portion, which is provided on the support member. Accordingly, when the abutting member is caused to abut against the media, the calibration reference object and the support member do not interfere with one another. In other words, it is possible to cause the abutting surface of the abutting member to abut against the one surface of the media while performing retention of the media using the support member.

In the color measurement device according to the application example, it is preferable that the abutting member is capable of moving between an abutting position in which the abutting surface abuts against the one surface of the media, and a retreat position that differs from the abutting position.

According to the application example, it is possible to cause the abutting member to abut against the media in a case in which color measurement of the one surface of the media is performed using the color measurement machine, and to move the abutting member to the retreat position in a case in which color measurement is not being performed. As a result of this, during non-color measurement, for example, the abutting member does not cause an obstruction in the transport of the media, a printing process on the media, or the like.

It is preferable that the color measurement device according to the application example further includes a lid portion that covers the calibration surface when the abutting member is positioned in the retreat position.

According to the application example, when the abutting member is positioned in the retreat position, the calibration surface of the calibration reference object is covered by the lid portion. Therefore, staining, and the like, such as ink and dust does not become attached to the calibration surface during non-color measurement. Accordingly, when the calibration reference value is acquired by measuring the calibration surface, it is possible to acquire a calibration reference value having high accuracy based on a calibration surface to which staining, and the like is not attached.

In the color measurement device according to the application example, it is preferable that the position determination section includes a support member that retains the media, and that the calibration reference object is connected to the support member.

According to the application example, the position determination section includes the support member, and the calibration reference object is connected to the support member. In such a case, as a result of the positions of the calibration surface and the one surface of the media being determined as a predetermined positional relationship by the position determination section, in the same manner as the above-mentioned application example, even in a case in which the media is changed, the difference (a difference in height) between the distance between the color measurement machine and the calibration surface when performing color measurement of the calibration surface, and the distance between the color measurement machine and the one surface of the media when performing color measurement of the media, still does not change. Accordingly, color measurement results do not change depending on the type of media, and it is possible to implement spectroscopic measurement having high accuracy.

In the color measurement device according to the application example, it is preferable that the position determination section includes an abutting member that includes an abutting surface, which abuts against the one surface of the media, and a biasing section that causes a portion of the calibration surface to abut against the abutting surface by biasing the calibration reference object against an abutting member side.

According to the application example, the positions of the calibration surface and the abutting surface are determined on the same planar surface as a result of a portion of the calibration surface abutting against the abutting surface due to the calibration reference object being biased against the abutting member side. Accordingly, when the abutting surface is caused to abut against the one surface of the media, the positions of the calibration surface and the one surface of the media are determined on the same planar surface regardless of the thickness dimension of the media. Accordingly, in the same manner as the above-mentioned application example, it is possible to perform spectroscopic measurement of the one surface of the media and spectroscopic measurement of the calibration surface with the same measurement conditions, and therefore, it is possible to implement spectroscopic measurement having even higher accuracy.

It is preferable that the color measurement device according to the application example further includes a color measurement machine that performs color measurement of the media, and a movement mechanism that relatively moves the color measurement machine in one direction with respect to the media.

According to the application example, it is possible to implement spectroscopic measurement of a region that follows the one direction by relatively moving the color measurement machine in the one direction of the media.

In the color measurement device according to the application example, it is preferable that the calibration reference object is provided in a relative movement pathway of the color measurement machine, which is relatively moved by the movement mechanism.

According to the application example, the calibration reference object is provided in a movement pathway of the color measurement machine. Accordingly, it is possible to implement spectroscopic measurement of the one surface of the media in a case in which the color measurement machine is in the position of the media when the color measurement machine is moved in the one direction, and it is possible to implement spectroscopic measurement of the calibration surface in a case in which the color measurement machine is in the position of the calibration reference object. Accordingly, it is possible to perform both spectroscopic measurement with respect to the media and spectroscopic measurement for calibration during an interval in which the color measurement machine is moved in the one direction.

In the color measurement device according to the application example, it is preferable that the position determination section is provided with an abutting member that includes an abutting surface, which abuts against one surface of the media, and is provided in a relative movement pathway of the color measurement machine, which is relatively moved by the movement mechanism, that the calibration reference object is provided on the abutting member on an abutting surface side, that the color measurement machine is positioned on a side that is opposite to the abutting surface of the abutting member, and that the abutting member is provided with a color measurement slit for performing color measurement of the media using the color measurement machine, and a calibration slit for performing color measurement of the calibration surface using the color measurement machine, and the color measurement slit and the calibration slit are provided along the one direction.

According to the application example, the calibration slit, which the calibration surface is exposed by, and the color measurement slit, which the one surface of the media is exposed by, are provided on the abutting member, and the calibration slit and the color measurement slit are disposed on a straight line. Accordingly, even in a state in which the abutting member is abutting against the media, it is possible to implement both spectroscopic measurement with respect to the media and spectroscopic measurement for calibration by moving the color measurement machine along in the one direction.

According to this application example, there is provided a printing apparatus including a color measurement device such as that mentioned above, and an image-forming portion that forms images on the media.

According to the application example, using the above-mentioned color measurement device, it is possible to implement spectroscopic measurement, having even higher accuracy, on an image that is formed on the media by the image-forming portion.

BRIEF DESCRIPTION OF THE DRAWINGS

The invention will be described with reference to the accompanying drawings, wherein like numbers reference like elements.

FIG. 14 is a cross-sectional view of a pressing force plate in another modification example.

FIG. 15 is a schematic cross-sectional view that shows a modification example of the second embodiment.

DESCRIPTION OF EXEMPLARY EMBODIMENTS

First Embodiment

Hereinafter, a first embodiment according to the invention will be described on the basis of drawings. In the present embodiment, a printer 1 (an ink jet printer) that is provided with a color measurement device will be described as an example of the printing apparatus of the invention.

Schematic Configuration of Printer

Figure 1:
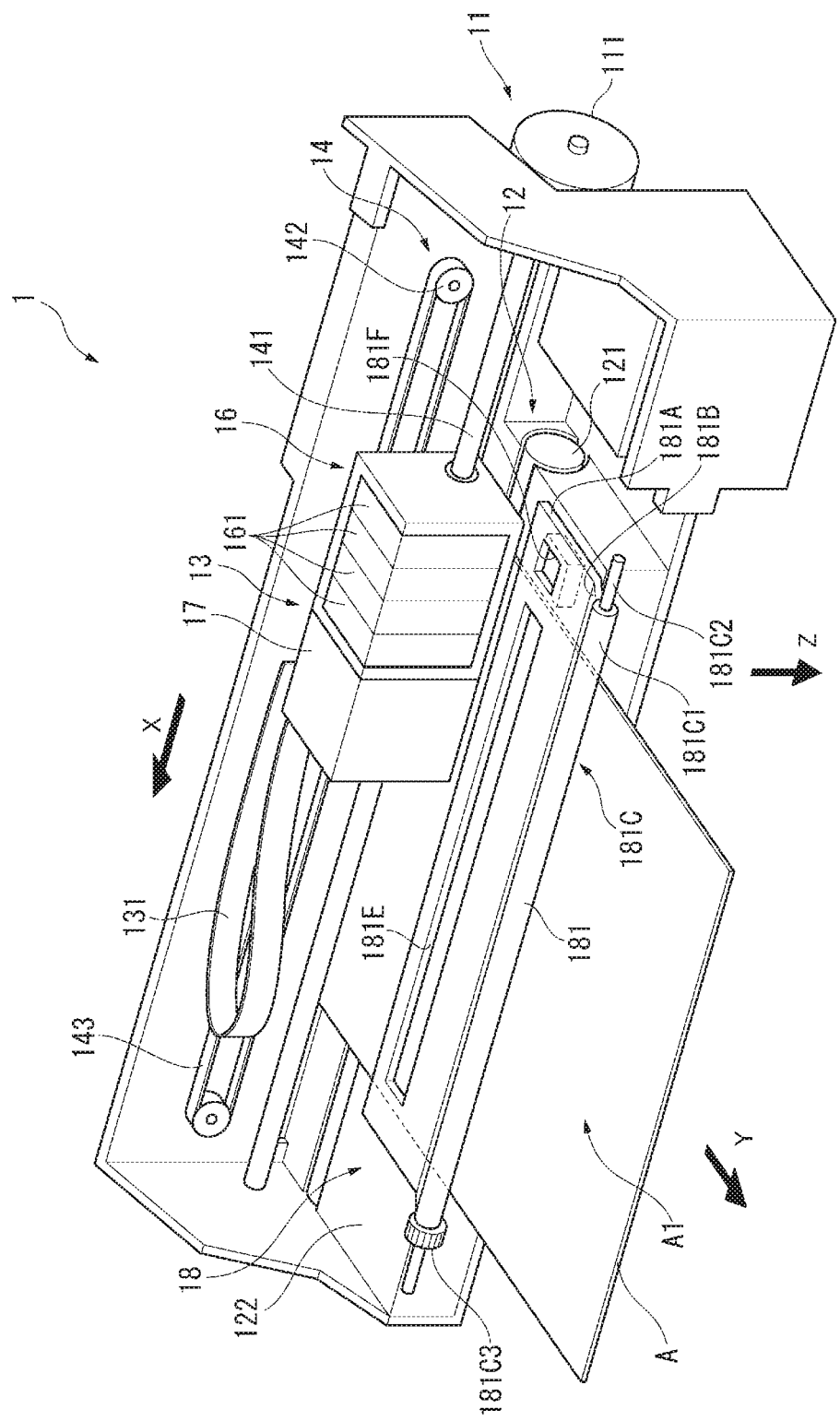
FIG. 1 is a view that shows a configuration example of the external appearance of a printer of a first embodiment.
Figure 2:
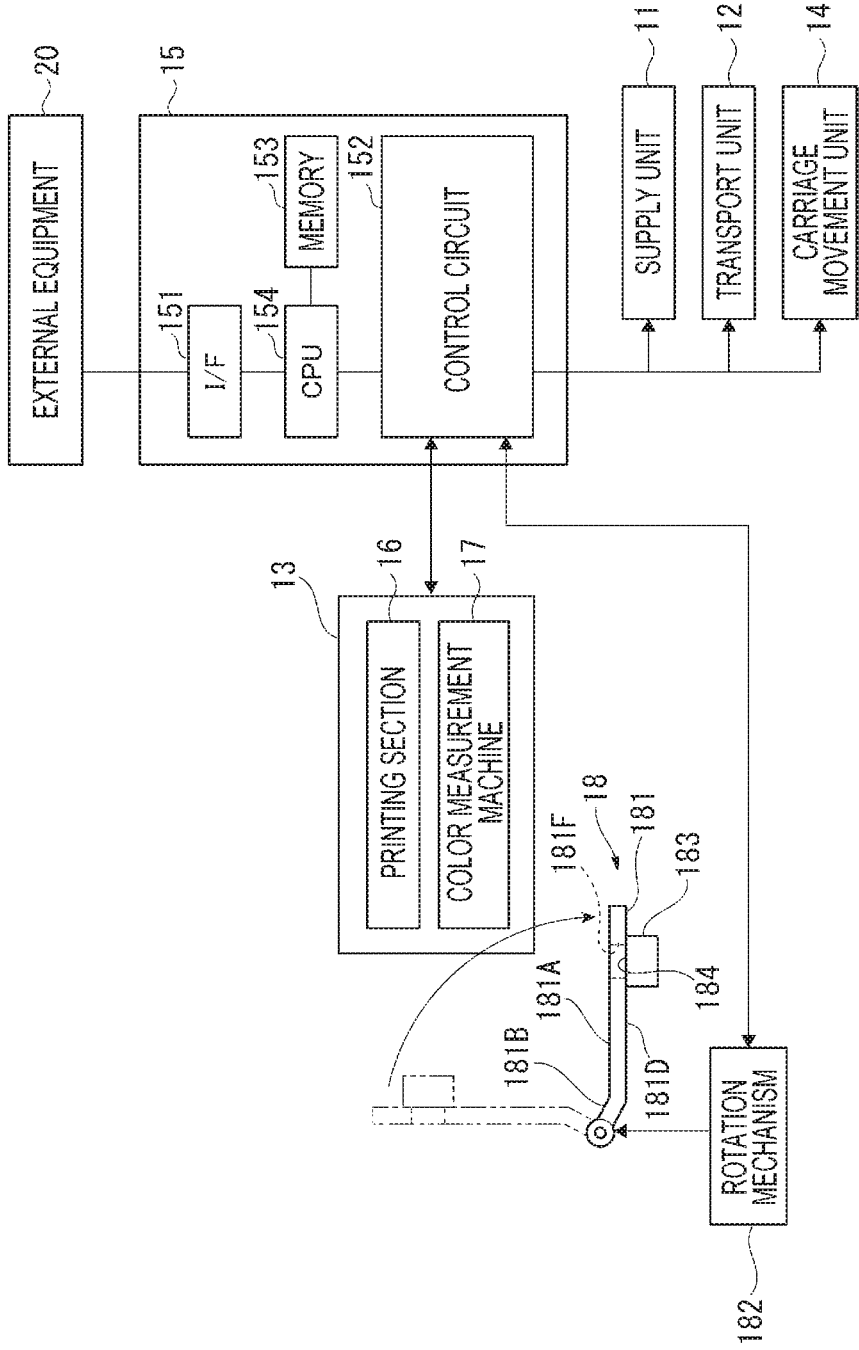
FIG. 2 is a block diagram that shows a schematic configuration of a printer of the first embodiment.

FIG. 1 is a view that shows a configuration example of the external appearance of the printer 1 of the present embodiment. FIG. 2 is a block diagram that shows a schematic configuration of the printer 1 of the present embodiment.

As shown in FIG. 1, the printer 1 is provided with a supply unit 11, a transport unit 12, a carriage 13, a carriage movement unit 14, a color measurement supplementary unit 18, and a control unit 15 (refer to FIG. 2). The printer 1 prints images on one surface (referred to as a media surface A1 from this point onwards) of media A by controlling each unit 11, 12, 14 and the carriage 13 on the basis of printing data that is input from external equipment 20 such as a personal computer, for example. In addition, the printer 1 forms a color patch for color measurement in a predetermined position of the media surface A1 on the basis of printing data for correction, which is set in advance, and performs spectroscopic measurement on the color patch. As a result of this, the printer 1 determines whether or not there is color shifting in printed colors by comparing a practical measurement value of the color patch with the printing data for calibration, and performs color correction on the basis of the practical measurement value in a case in which there is color shifting. In the spectroscopic measurement, a measurement result of a calibration surface of a calibration reference object 183, which is provided in the color measurement supplementary unit 18, is set as a calibration reference value, and an accurate measurement result is obtained by correcting the measurement value of a color patch.

Hereinafter, each configuration of the printer 1 will be specifically described.

The supply unit 11 is a unit that supplies the media A (a paper surface is illustrated by way of example in the present embodiment), which corresponds to an image formation target, to an image formation position. The supply unit 11 is, for example, provided with a rolled body 111 (refer to FIG. 1), which the media A is wound around, a roll driving motor (not illustrated in the drawings), a roll driving wheel column (not illustrated in the drawings), and the like. Further, the roll driving motor is driven in a rotational manner on the basis of an instruction from the control unit 15, and the rotational force of the roll driving motor is transmitted to the rolled body 111 through the roll driving wheel column. As a result of this, the rolled body 111 rotates, and the paper surface, which is wound around the rolled body 111, is supplied to a downstream side (a +Y direction) in a Y direction (a sub-scanning direction).

Additionally, in the present embodiment, an example in which a paper surface, which is wound around the rolled body 111, is supplied, is shown, but the invention is not limited to this configuration. For example, the media A may be supplied using any supply method such as supplying the media A, such as a paper surface that is loaded in a tray, or the like, for example, one sheet at a time using a roller or the like.

The transport unit 12 transports the media A, which is supplied from the supply unit 11, along the Y direction. The transport unit 12 is configured to include a transport roller 121, a driven roller (not illustrated in the drawings) that is disposed interposed between the transport roller 121 and the media A, and which is driven by the transport roller 121, and a platen 122.

A driving force from a transport motor, which is not illustrated in the drawings, is transmitted to the transport roller 121, and when the transport motor is driven due to the control of the control unit 15, the transport roller 121 is driven in a rotational manner by the rotational force, and transports the media A along the Y direction in a state of being clamped between the driven roller and the transport roller 121. In addition, the platen 122, which faces the carriage 13, is provided on a downstream side (a +Y side) in the Y direction of the transport roller 121. The platen 122 configures a support member in the invention, and retains the media A by abutting against a surface of the media A, which is transported in the sub-scanning direction (the Y direction) on a side that is opposite to the media surface A1.

In addition, a concave shape accommodation portion 122A (refer to FIG. 3), in which the calibration reference object 183, which will be described later, is accommodated, is provided in the platen 122.

The carriage 13 is provided with a printing portion 16, which prints images on the media surface A1 of the media A, and a color measurement machine 17 that performs spectroscopic measurement of predetermined measurement position of the media surface A1.

The carriage 13 is provided so as to be movable along a main scanning direction (an X direction), which intersects the Y direction by the carriage movement unit 14.

In addition, the carriage 13 is connected to the control unit 15 by a flexible circuit 131, and a printing process (an image-forming process on the media surface A1) by the printing portion 16 and spectroscopic measurement by the color measurement machine 17 are implemented on the basis of an instruction from the control unit 15.

Additionally, the specific configuration of the carriage 13 will be mentioned later.

The carriage movement unit 14 configures a movement mechanism in the present embodiment, and causes the carriage 13 to reciprocate along the X direction on the basis of an instruction from the control unit 15.

The carriage movement unit 14 is, for example, configured to include a carriage guide shaft 141, a carriage motor 142, and a timing belt 143.

The carriage guide shaft 141 is disposed along the X direction, and for example, both end portions thereof are fixed to a housing of the printer 1. The carriage motor 142 drives the timing belt 143. The timing belt 143 is supported in a manner that is substantially parallel to the carriage guide shaft 141, and a portion of the carriage 13 is fixed thereto. Further, when the carriage motor 142 is driven on the basis of an instruction of the control unit 15, the timing belt 143 is caused to travel in a normal and a reverse manner, and the carriage 13, which is fixed to the timing belt 143 reciprocates guided on the carriage guide shaft 141.

Next, the configurations of the printing portion 16 and the color measurement machine 17, which are provided in the carriage 13, will be described.

Configuration of Printing Section (Image-Forming Section)

The printing portion 16 is an image-forming portion of the invention, is provided facing the media A, and forms images by respectively discharging ink of a plurality of colors separately onto the media surface A1.

Ink cartridges 161, which correspond to the ink of the plurality of colors, are detachably mounted in the printing portion 16, and ink is supplied to ink tanks (not illustrated in the drawings) from each ink cartridge 161 via tubes (not illustrated in the drawings). In addition, nozzles (not illustrated in the drawing) that discharge ink droplets are provided on the lower surface (a position that faces the media surface A1) of the printing portion 16 to correspond to each color. For example, piezo elements are disposed in the nozzles, and dots are formed by discharging and landing ink droplets, which are supplied from the ink tanks, on the media surface A1 as a result of driving the piezo elements.

Configuration of Color Measurement Machine

Figure 3:
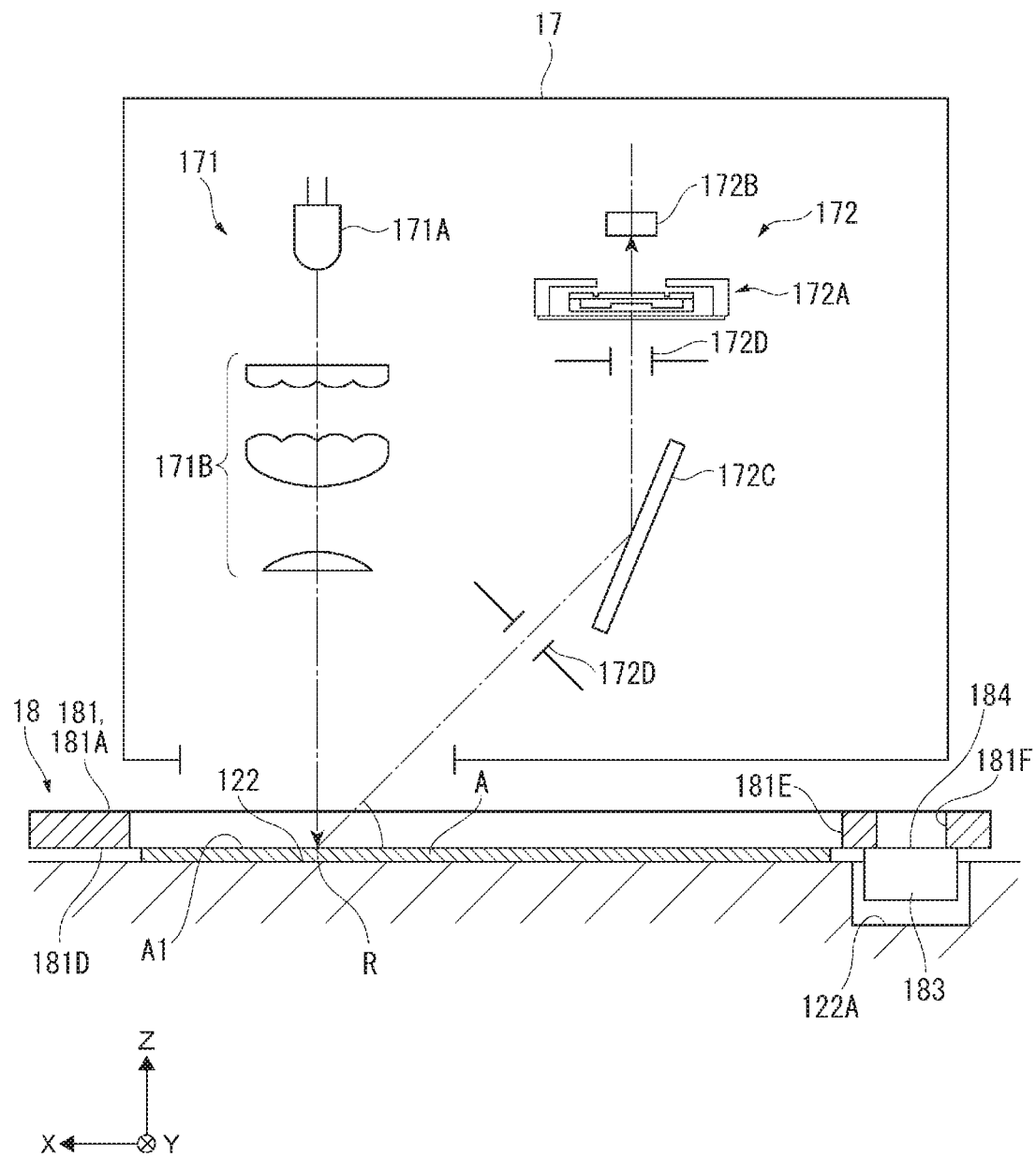
FIG. 3 is a schematic view that shows a configuration of a color measurement machine of the first embodiment.

FIG. 3 is a schematic view that shows a configuration of the color measurement machine 17.

As shown in FIG. 3, the color measurement machine 17 is provided with an illumination optical system 171 and a light reception optical system 172.

The color measurement machine 17 irradiates the media A with illumination light from the illumination optical system 171, and receives reflected light, which is reflected by a color measurement target (the media surface A1, a calibration surface 184 of the calibration reference object 183, or the like) using the light reception optical system 172. A spectroscopic device 172A, which is provided in the light reception optical system 172, is capable of selecting transmission wavelength on the basis of the control of the control unit 15, and spectroscopic measurement of the measurement target is possible measuring the light quantity of the light of each wavelength of visible light. Additionally, the spectroscopic measurement that is used in the color measurement machine refers to spectroscopic measurement that measures the light quantity of each spectroscopic wavelength that is included in light that is reflected from the measurement target.

Additionally, in the present embodiment, spectroscopic measurement is implemented in accordance with a (0°: 45° x) method in optical geometric conditions that are defined by color measurement standard (JIS Z 8722). That is, in the present embodiment, illumination light from the illumination optical system 171 is caused to be incident to a measurement target in a normal line direction (an incidence angle of 10° or less), and light that is reflected by the measurement target at 45°±2° is received by the light reception optical system 172.

Additionally, in the present embodiment, for convenience of description, a configuration in which the illumination optical system 171 and the light reception optical system 172 are aligned along the X direction is illustrated by way of example, but the invention is not limited to this configuration, and a configuration in which the illumination optical system 171 and the light reception optical system 172 are aligned along the Y direction, and a configuration in which the illumination optical system 171 and the light reception optical system 172 are aligned along a direction that intersects the X and Y directions, are also possible.

Configuration of Illumination Optical System

As shown in FIG. 3, the illumination optical system 171 is provided with a light source 171A and an illumination side lens 171B.

In the illumination optical system 171, the measurement target is irradiated with light that is output from the light source 171A via the illumination side lens 171B. For example, the illumination side lens 171B can be configured by a plurality of lenses. For example, an integrator optical system can be illustrated as an example of such an illumination side lens 171B, and in a case in which an integrator optical system is used, and it is possible to irradiate the media A by setting the light quantity distribution of light from the light source 171A to be substantially uniform within a plane, and enlarging an irradiation range of light.

Configuration of Light Reception Optical System

As shown in FIG. 3, the light reception optical system 172 is provided with a spectroscopic device 172A, a light reception portion 172B, a reflective mirror 172C, and a light reception side aperture 172D.

In such a light reception optical system 172, light that is reflected at a measurement position R of the media A is reflected on a spectroscopic device 172A side by the reflective mirror 172C, and light of a predetermined wavelength that is split by the spectroscopic device 172A is received by the light reception portion 172B. In addition, for example, the light reception side aperture 172D is provided in a pair, and light that passes through the light reception side apertures 172D is received by the light reception portion 172B. Additionally, in FIG. 3, an example in which the light reception side apertures 172D are provided before and after the reflective mirror 172C, is shown, but the invention is not limited to this configuration, and for example, configurations in which the light reception side apertures 172D are provided before and after the spectroscopic device 172A, or in which two light reception side apertures 172D are provided between the spectroscopic device 172A and the reflective mirror 172C, between the spectroscopic device 172A and the light reception portion 172B, or before the reflective mirror 172C, may also be used.

In addition, a configuration in which a band-pass filter is provided as the light reception optical system 172, and light other than visible light is excluded by the band-pass filter, may also be used. Additionally, in the present embodiment, a configuration in which reflected light is reflected toward the light reception portion 172B by the reflective mirror 172C is illustrated by way of example, but a configuration in which the reflective mirror 172C is not provided, and light that is incident to the light reception optical system 172 is directly incident to the spectroscopic device 172A, may also be used.

Configuration of Spectroscopic Device

Figure 4:
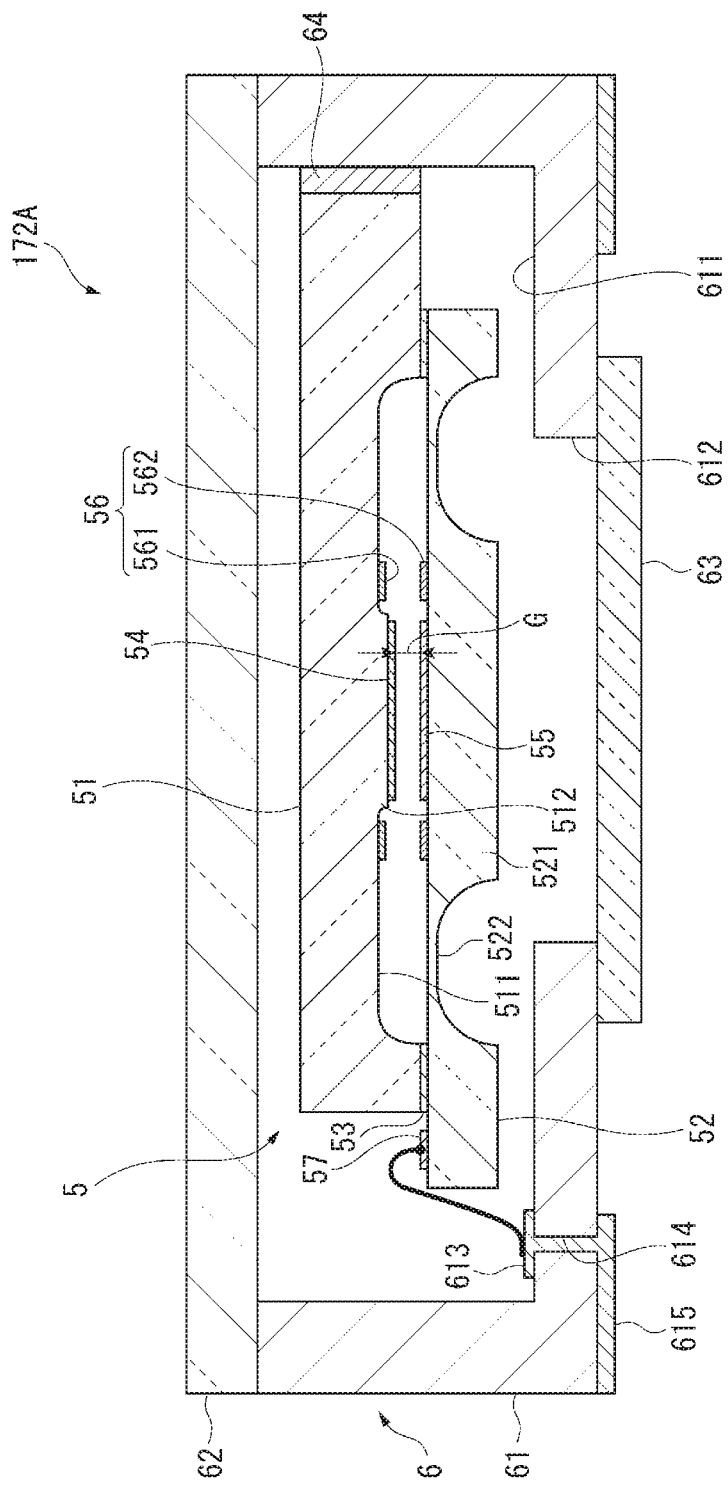
FIG. 4 is a cross-sectional view that shows a schematic configuration of a spectroscopic device of the first embodiment.

FIG. 4 is a cross-sectional view that shows a schematic configuration of the spectroscopic device 172A.

The spectroscopic device 172A is provided with a housing 6, and a wavelength variable interference filter 5 (a spectroscopic element) that is accommodated in an inner portion of the housing 6.

Configuration of Wavelength Variable Interference Filter

The wavelength variable interference filter 5 is a wavelength variable type Fabry-Perot etalon element, and configures a spectroscopic element in the invention. In the present embodiment, an example in which the wavelength variable interference filter 5 is disposed on the color measurement machine 17 in a state of being accommodated in the housing 6, is shown, but for example, a configuration in which the wavelength variable interference filter 5 is disposed directly on the color measurement machine 17, or the like, may also be used.

As shown in FIG. 4, the wavelength variable interference filter 5 is provided with a light-transmissive fixed substrate 51 and a movable substrate 52, and the fixed substrate 51 and the movable substrate 52 are configured in an integral manner as a result of bonding using a bonding film 53. A first channel portion 511, and a second channel portion 512 having a more shallow channel depth than that of the first channel portion 511, which are formed using etching, are provided in the fixed substrate 51, and fixed electrodes 561 and a fixed reflective film 54 are respectively provided on the first channel portion 511 and the second channel portion 512. For example, the fixed reflective film 54 is configured by a dielectric multi-layered film in which a metal film such as Ag, a metal film such as an Ag alloy, a high refractive layer and a low refractive layer are laminated, or a laminated body in which a metal film (an alloy film) and a dielectric multi-layered film are laminated.

The movable substrate 52 is provided with a movable portion 521, and retaining portions 522, which are provided on the outside of the movable portion 521, and which retain the movable portion 521. Movable electrodes 562, which face the fixed electrodes 561, and a movable reflective film 55, which faces the fixed reflective film 54, are provided on a surface of the movable portion 521 that faces the fixed substrate 51. It is possible for a reflective film having the same configuration as that of the fixed reflective film 54, which is mentioned above, to be used as the movable reflective film 55. The retaining portion 522 is a diaphragm that surrounds the periphery of the movable portion 521, and is formed so that the thickness dimension thereof is smaller than that of the movable portion 521.

Further, in a wavelength variable interference filter 5 such as that mentioned above, electrostatic actuators 56 are configured by the fixed electrodes 561 and the movable electrodes 562, and it is possible to alter an interval dimension of a gap G between the fixed reflective film 54 and the movable reflective film 55 by applying a voltage to the electrostatic actuators 56. In addition, a plurality of electrode pads 57, which are individually connected to the fixed electrodes 561 and the movable electrodes 562, are provided in an outer peripheral portion (a region that does not face the fixed substrate 51) of the movable substrate 52.

Configuration of Housing

As shown in FIG. 4, the housing 6 is provided with a base 61, and a glass substrate 62. An accommodation space is formed inside the base 61 and the glass substrate 62 as a result of bonding using low melting point glass bonding, for example, and the wavelength variable interference filter 5 is accommodated inside the accommodation space.

The base 61 is configured by laminating a thin plate shape ceramic material, for example, and includes a recessed portion 611 that is capable of accommodating the wavelength variable interference filter 5. The wavelength variable interference filter 5 is fixed to, for example, a side surface of the recessed portion 611 of the base 61 using a fixing material 64. A light-transmissive hole 612 is provided on a bottom surface of the recessed portion 611 of the base 61, and a cover glass 63, which covers the light-transmissive hole 612, is bonded onto the bottom surface.

In addition, an inner side terminal portion 613, which is connected to the electrode pads 57 of the wavelength variable interference filter 5, is provided on the base 61, and the inner side terminal portion 613 is connected to an outer side terminal portion 615, which is provided on an outer side of the base 61, through a conductive hole 614. The outer side terminal portion 615 is electrically connected to the control unit 15.

Configuration of Light Reception Portion

Returning to FIG. 3, the light reception portion 172B is disposed along an optical axis (along a straight line that passes through the center points of the fixed reflective films 54 and 55) of the wavelength variable interference filter 5, receives light that is transmitted by the wavelength variable interference filter 5, and outputs a detection signal (a current value) that depends on a received light quantity. Additionally, the detection signal that is output by the light reception portion 172B is input to the control unit 15 through an I-V converter (not illustrated in the drawings), an amplifier (not illustrated in the drawings), and an AD converter (not illustrated in the drawings).

Configuration of Color Measurement Supplementary Unit

Figure 5:
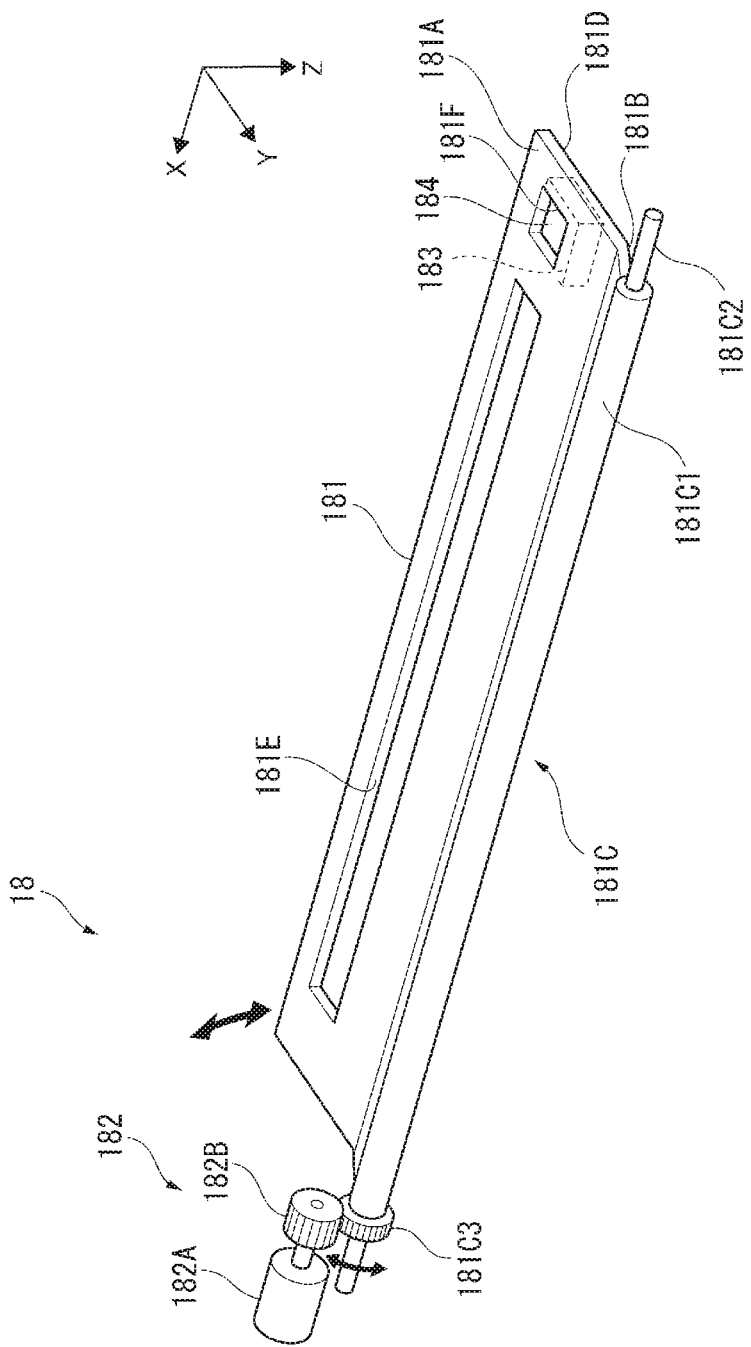
FIG. 5 is a perspective view that shows a schematic configuration of a color measurement supplementary unit of the first embodiment.
Figure 6:
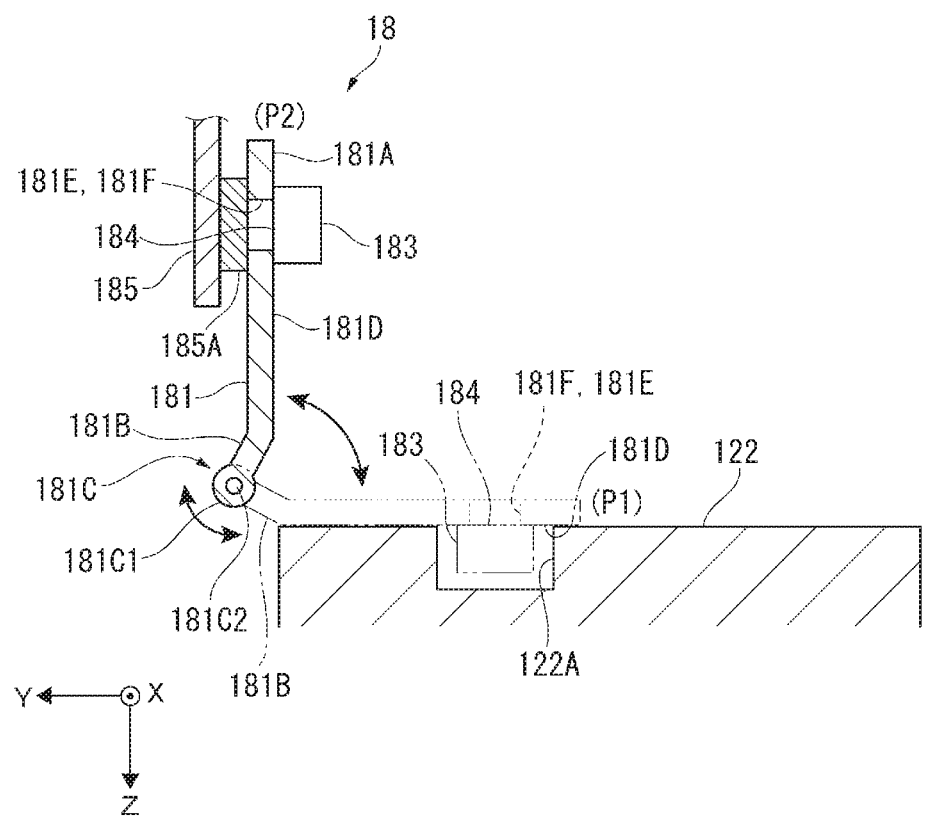
FIG. 6 is a side view of the color measurement supplementary unit of the first embodiment.
Figure 7:
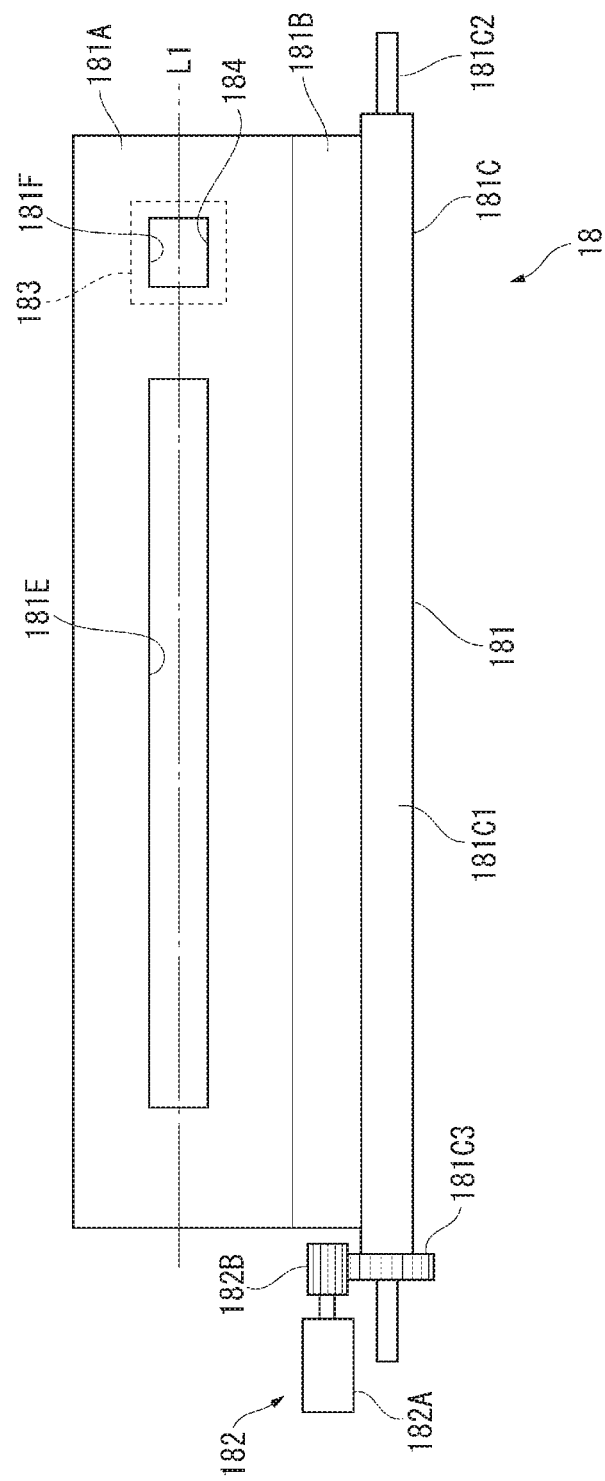
FIG. 7 is a plan view of the color measurement supplementary unit of the first embodiment.

FIG. 5 is a perspective view that shows a schematic configuration of the color measurement supplementary unit 18, FIG. 6 is a side view when the color measurement supplementary unit 18 is viewed from a +X side toward a −X side, and FIG. 7 is a plan view when the color measurement supplementary unit 18 is viewed from a −Z side toward a +Z side.

The color measurement supplementary unit 18 configures a position determination section in the invention, as shown in FIGS. 5 to 7, the color measurement supplementary unit 18 is disposed in a position (on the −Z side) that faces the platen 122, and is provided with a pressing force plate 181, a rotation mechanism 182, and a calibration reference object 183.

The pressing force plate 181 configures an abutting member in the invention. As shown in FIG. 6, the pressing force plate 181 is configured to be capable of rotating between an abutting position P1, which abuts against the media A, and a retreat position P2, which is separated from the media A, using the rotation mechanism 182.

The pressing force plate 181 is provided with a rectangular pressing portion 181A, which is longitudinal in the Y direction, an arm portion 181B that is connected to an end edge on the +Y side of the pressing portion 181A, and a rotational shaft portion 181C, which is provided at a tip end if the arm portion 181B.

The pressing portion 181A is provided with an abutting surface 181D that is capable of abutting against the media surface A1 of the media A, and applies a pressing force to the media A to a platen 122 side as a result of the abutting surface 181D abutting against the media surface A1 when rotated to the abutting position P1.

In addition, a color measurement slit 181E and a calibration slit 181F are provided in the pressing portion 181A along a virtual line L1 (refer to FIG. 7) that follows the X direction. The color measurement slit 181E and the calibration slit 181F are penetration holes that penetrate through the pressing portion 181A in a thickness direction thereof. The virtual line L1 coincides (or substantially coincides) with a movement pathway (a movement trajectory) of the measurement position R of the color measurement machine 17 when the pressing force plate 181 is rotated to the abutting position P1 and the carriage 13 is moved along the X direction. Accordingly, the color measurement machine can implement spectroscopic measurement of the media surface A1 that is exposed from the color measurement slit 181E, and in addition, can perform spectroscopic measurement of the calibration surface 184 of the calibration reference object 183 that is exposed from the calibration slit 181F.

The arm portion 181B us a portion at which the pressing portion 181A and the rotational shaft portion 181C are connected. The arm portion 181B is formed extending on the −Z side from the pressing portion 181A in a state in which the pressing force plate 181 is positioned in the abutting position P1. Additionally, the arm portion 181B of the present embodiment shows an example of being inclined in a direction of separation from the platen 122 with progression toward the +Y side in the abutting position P1, but the invention is not limited to this configuration. For example, a configuration in which the arm portion 181B is orthogonal to the pressing portion 181A, a configuration of being inclined in a direction of separation from the platen 122 with progression toward a −Y side in the abutting position P1, and the like, may also be used.

Further, the rotational shaft portion 181C, which corresponds to a rotational center of the pressing force plate 181 is connected to a tip end (a side that is opposite to a base end side that is connected to the pressing portion 181A) of the arm portion 181B. As a result of this, by rotating with the rotational shaft portion 181C as the center thereof, the pressing portion 181A is separated from the media A, and transport of the media A is not inhibited.

The rotational shaft portion 181C is configured to include a connection portion 181C1 that is connected to the arm portion 181B, a core shaft 181C2, and a driving gear 181C3 that is provided at one end section in an axial direction of the connection portion 181C1.

The connection portion 181C1 is a tube-shaped member having a central shaft that follows the X direction, and the core shaft 181C2 is inserted through an inner portion of the tube.

The core shaft 181C2 is retained with respect to a frame (not illustrated in the drawings) of the printer 1, for example.

In this instance, the connection portion 181C1 and the core shaft 181C2 may be bonded together, and a configuration in which the connection portion 181C1 is capable of rotating with respect to the core shaft 181C2 may be used. In a case in which the connection portion 181C1 and the core shaft 181C2 are bonded together, and the connection portion 181C1 is not capable of rotating with respect to the core shaft 181C2, the core shaft 181C2 is retained in the frame of the printer 1 in a rotatable manner. In this case, the invention is not limited to a configuration in which the core shaft 181C2 is inserted through the connection portion 181C1, and a configuration in which the connection portion 181C1 and the core shaft 181C2 are formed in an integral manner, may also be used.

On the other hand, in a case in which the connection portion 181C1 is capable of rotating with respect to the core shaft 181C2, the core shaft 181C2 may be fixed to the frame of the printer 1. That is, a configuration in which the core shaft 181C2 is not capable of rotating, may also be used. In this case, for example, a guide member such as a snap ring (a retaining ring) may be provided on the core shaft 181C2 in order to regulate movement of the connection portion 181C1 in the X direction.

The driving gear 181C3 rotates the connection portion 181C1 as a result of a driving force being transmitted from the rotation mechanism 182. As a result of this, the pressing force plate 181 is rotated between the abutting position P1 and the retreat position P2.

For example, the rotation mechanism 182 is provided with a driving motor 182A that is capable of normal and reverse rotation, and a transmission gear 182B that is provided along a driving shaft of the driving motor 182A, and is engaged with the driving gear 181C3. The driving motor 182A is driven under the control from the control unit 15, and the pressing force plate 181 is rotated to the abutting position P1 when spectroscopic measurement is implemented using the color measurement machine 17, and the pressing force plate 181 is rotated to the retreat position P2 when the spectroscopic measurement is finished.

The calibration reference object 183 is provided on the abutting surface 181D of the pressing portion 181A of the pressing force plate 181.

More specifically, the calibration reference object 183 is provided with a planar calibration surface 184 having a size that is slightly larger than that of the calibration slit 181F, and is bonded in a manner that covers the calibration slit 181F using the calibration surface 184. Accordingly, as shown in FIG. 7, when the pressing force plate 181 is viewed from the −Z side, the calibration surface 184 is exposed from the calibration slit 181F. In addition, since the calibration surface 184 is bonded to the abutting surface 181D, the calibration surface 184 is positioned on the same planar surface as the abutting surface 181D.

The calibration surface 184 includes a spectroscopic spectrum for which the reflectance with respect to each wavelength when performing spectroscopic measurement using the color measurement machine, is already known, and for example, is configured to be white, in which the reflectance with respect to each wavelength is 99.9% or more.

In the manner mentioned above, when the pressing force plate 181 is moved to the abutting position P1, the calibration reference object 183 is accommodated in an accommodation portion 122A (refer to FIGS. 3 and 6), which is provided in the platen 122. Accordingly, it is possible to suitably apply a pressing force to the media A to the platen 122 side using the pressing force plate 181 without the calibration reference object 183 and the platen 122 interfere with one another.

In addition, a lid portion 185, which blocks the calibration slit 181F from a side of the pressing portion 181A that is opposite to the abutting surface 181D when the pressing force plate 181 is moved to the retreat position P2, is provided on the frame of the printer 1. The lid portion 185 is provided with a sealing member 185A, which is made from rubber, for example, and the calibration slit 181F is sealed by the sealing member 185A when the pressing force plate 181 is moved to the retreat position P2. As a result of this, it is possible to suppress the inconvenience of the calibration surface 184 becoming stained due to liquid droplets, dirt, and the like infiltrating inside the calibration slit 181F during non-measurement, and therefore, it is possible to obtain accurate calibration reference values during spectroscopic measurement of the calibration surface 184.

Configuration of Control Unit

As shown in FIG. 2, the control unit 15 is configured to include an I/F 151, a unit control circuit 152, a memory 153, and a Central Processing Unit (CPU) 154.

The I/F 151 inputs printing data to the CPU 154 from the external equipment 20.

The unit control circuit 152 is provided with control circuits that respectively control the supply unit 11, the transport unit 12, the printing portion 16, the light source 171A, the wavelength variable interference filter 5, the light reception portion 172B, the carriage movement unit 14, and the color measurement supplementary unit 18, and the actions of each unit are controlled on the basis of instruction signals from the CPU 154. Additionally, the control circuits of each unit are provided separately from the control unit 15, and may be connected to the control unit 15.

The memory 153 stores various programs and various data for controlling the actions of the printer 1.

For example, examples of the various data include V–λ data that shows the wavelength of light that is transmitted by the wavelength variable interference filter 5 with respect to an application voltage to the electrostatic actuators 56 when the wavelength variable interference filter 5 is controlled, printing profile data that stored a discharge amount of each ink for the colors that are included in the printing data, and the like. In addition, luminescent properties for each wavelength of the light source 171A, light reception properties (light reception sensitivity properties) for each wavelength of the light reception portion 172B, and the like, may also be stored.

Figure 8:
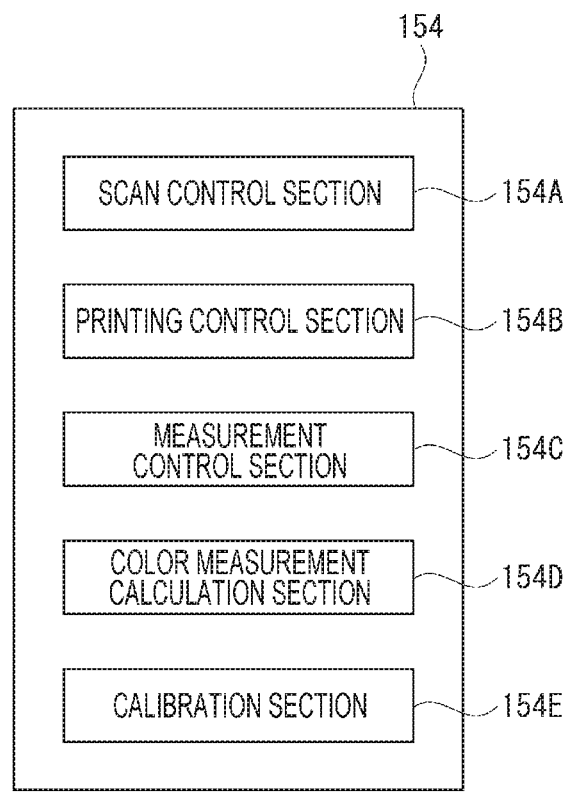
FIG. 8 is a block diagram that shows a functional configuration of a CPU in the first embodiment.

FIG. 8 is a block diagram in which a functional configuration of the CPU 154, which is included in the control unit 15 of the printer 1, is shown.

As a result of reading and executing various programs that are stored in the memory 153, As shown in FIG. 8, the CPU 154 functions as a scan control section 154A, a printing control section 154B, a measurement control section 154C, a color measurement calculation section 154D, a calibration section 154E, and the like.

The scan control section 154A outputs instruction signals for driving the supply unit 11, the transport unit and the carriage movement unit 14, to the unit control circuit 152. As a result of this, the unit control circuit 152 drives the roll driving motor of the supply unit 11, and the media A is supplied to the transport unit 12. In addition, the unit control circuit 152 drives the transport motor of the transport unit 12, and a predetermined region of the media A is transported along the Y direction up to a position that faces the carriage 13 of the platen 122. In addition, the unit control circuit 152 drives the carriage motor 142 of the carriage movement unit 14, and the carriage 13 is moved along the X direction.

The printing control section 154B outputs an instruction signal for controlling the printing portion 16 on the basis of the printing data that is input from the external equipment 20, for example, to the unit control circuit 152. When an instruction signal is output to the unit control circuit 152 from the printing control section 154B, the unit control circuit 152 outputs a printing control signal to the printing portion 16, and ink is discharged onto the media A by driving the piezo elements that are provided in the nozzles. Additionally, when printing is being executed, an image, which is configured from a plurality of dots, is printed on the media A by alternately repeating a dot formation action, which forms dots as a result of the carriage 13 being moved along the X direction and ink being discharged from the printing portion during the movement, and a transport action that transports the media A in the Y direction.

The measurement control section 154C implements spectroscopic measurement. More specifically, the measurement control section 154C emits light from the light source 171A by outputting an instruction signal for controlling the light source 171A to the unit control circuit 152.

In addition, the measurement control section 154C reads the driving voltage of the electrostatic actuators 56 for a wavelength of light that transmits the wavelength variable interference filter 5 from the V–λ data of the memory 153, and outputs an instruction signal to the unit control circuit 152. As a result of this, the unit control circuit 152 applies an instructed driving voltage to the wavelength variable interference filter 5, and light of a desired transmission wavelength is transmitted from the wavelength variable interference filter 5.

The measurement control section 154C performs storage in the memory 153 in association with the voltage (or, the wavelength of light that is transmitted by the wavelength variable interference filter 5 that corresponds to the corresponding wavelength) that is applied to the electrostatic actuators 56.

In addition, the measurement control section 154C moves the pressing force plate 181 to the abutting position P1 and applies a pressing force to the media A by controlling the rotation mechanism 182 of the color measurement supplementary unit 18 during spectroscopic measurement. Furthermore, when spectroscopic measurement using the color measurement machine 17 is finished, the measurement control section 154C moves the pressing force plate 181 to the retreat position P2 by controlling the rotation mechanism 182.

The color measurement calculation section 154D measures the chromaticity of the measurement position R on the basis of a received light quantity for light of a plurality of wavelengths that are obtained using spectroscopic measurement.

The calibration section 154E corrects (updates) the printing profile data on the basis of the color measurement result from the color measurement calculation section 154D.

Spectroscopic Measurement Method

Next, a color measurement process in the printer 1 of the present embodiment will be described on the basis of drawings.

Figure 9:
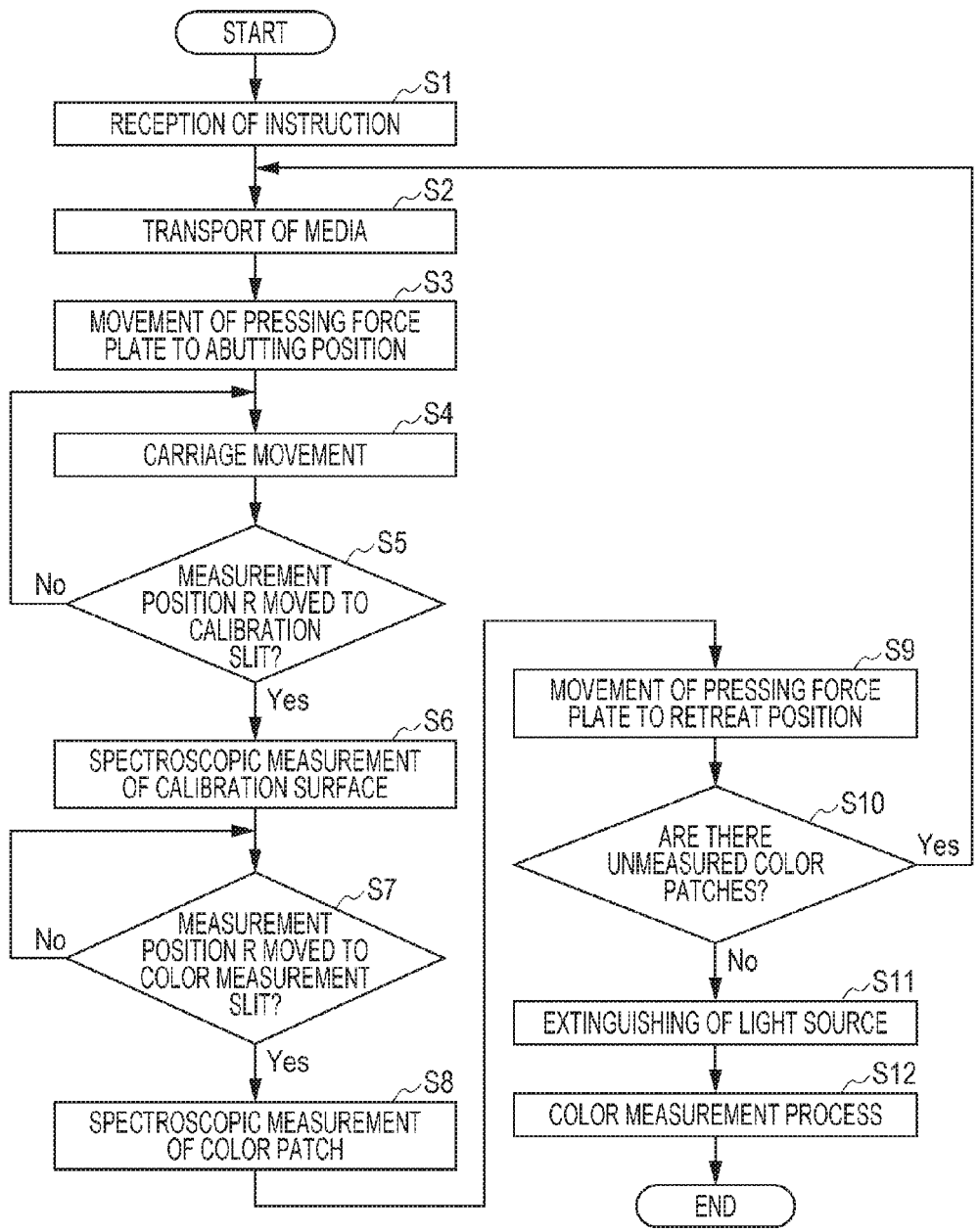
FIG. 9 is a flowchart that shows a color measurement process in the first embodiment.

FIG. 9 is a flowchart that shows the color measurement process in the printer 1.

In this instance, an example in which a color measurement process is implemented on a plurality of color patches that are printed by the printing portion 16, for example, will be described as the color measurement process by the printer 1.

For example, in the color measurement process of the present example, an instruction for implementing the color measurement process is received as a result of user operation, input from the external equipment 20, or the like (Step S1). When an instruction is received in Step S1, the scan control section 154A transports the media A along the Y direction so that the measurement position R of the color measurement machine is positioned on a line on which a color patch is disposed, as a result of controlling the transport unit 12 (Step S2). Additionally, in an initial state, the carriage 13 is set to be positioned in a home position.

Further, the measurement control section 154C moves the pressing force plate 181 to the abutting position P1 by controlling the rotation mechanism 182 (Step S3). As a result of this, a pressing force is applied to the media A to the platen 122 side as a result of the abutting surface 181D of the pressing portion 181A abutting against the media surface A1 of the media A. In addition, in the abovementioned manner, since the calibration surface 184 of the calibration reference object 183 abuts against the abutting surface 181D, the positions of the calibration surface 184 and the media surface A1 are determined on the same planar surface (the distances from the platen 122 are equivalent).

Thereafter, the scan control section 154A moves the carriage 13 to the +X side (Step S4). In this instance, for example, the carriage 13 is moved in the X direction as a result of constant velocity rectilinear motion. Accordingly, the position of the measurement position R of the color measurement machine 17 can be easily calculated using the movement velocity of the carriage 13 and the elapsed time since the initiation of movement.

Further, the measurement control section 154C determines whether or not the calculated measurement position R has moved up to the calibration slit 181F (Step S5). In a case in which No is determined by Step S5, the process returns to Step S4, and the movement of the carriage 13 continues.

On the other hand, in a case in which Yes is determined by Step S5, the measurement control section 154C implements spectroscopic measurement of the calibration surface 184 by turning on the light source 171A (Step S6).

In the spectroscopic measurement, for example, the measurement control section 154C measures measurement values (calibration reference values) for, a 16-band measurement wavelength that corresponds to 20 nm of visible light from 400 nm to 700 nm, by sequentially switching a driving voltage to the electrostatic actuators 56 of the wavelength variable interference filter 5 on the basis of the V–λ data that is stored in the memory 153. The measurement values (calibration reference values) that are obtained by measurement are stored in the memory 153 as appropriate.

Additionally, in the spectroscopic measurement of the calibration surface 184, the carriage 13 may be stopped, or in a case in which it is possible to acquire the calibration reference values for the 16-band measurement wavelength during an interval in which the measurement position R traverses the calibration slit 181F, the spectroscopic measurement may be implemented while moving the carriage 13.

After the spectroscopic measurement of the calibration surface 184 is finished, the scan control section 154A moves the carriage 13 in the +X direction again. In addition, the measurement control section 154C determines whether or not the measurement position R has moved up to the color measurement slit 181E (Step S7). In a case in which No is determined by Step S7, the process returns to Step S7, and the movement of the carriage 13 continues.

On the other hand, in a case in which Yes is determined by Step S7, the measurement control section 154C implements spectroscopic measurement of a color patch that is formed on the media surface A1 (Step S8).

In the same manner as Step S6, the spectroscopic measurement, for example, the measurement control section 154C measures measurement values for, a 16-band measurement wavelength that corresponds to 20 nm of visible light from 400 nm to 700 nm. The measurement values that are obtained by measurement are stored in the memory 153 as appropriate.

Thereafter, the scan control section 154A returns the carriage 13 to the home position, and the measurement control section 154C moves the pressing force plate 181 to the retreat position P2 by controlling the rotation mechanism 182 (Step S9).

In addition, the measurement control section 154C determines whether or not there are unmeasured color patches (Step S10).

In a case in which Yes is determined in Step S10, the process returns to Step S2, and the scan control section 154A implements spectroscopic measurement of the calibration surface 184 and spectroscopic measurement of a color patch on the media surface A1 by transporting the media A up to a line at which the measurement position R in the color measurement machine 17 corresponds to a subsequent color patch, as a result of controlling the transport unit 12. Additionally, in the spectroscopic measurement of a second and upwards color patch, the acquisition process of the calibration reference value for the calibration surface 184 in Step S6 may be omitted.

In a case in which No is determined in Step S10, the measurement control section 154C turning off the light source 171A (Step S11).

Thereafter, the color measurement calculation section 154D of the control unit 15 implements the color measurement process on the basis of the calibration reference value that is stored in the memory 153, and the measurement value for each color patch (Step S12). More specifically, the color measurement calculation section 154D calculates the reflectance for each measurement wavelength on the basis of the measurement value of each measurement wavelength and the calibration reference value, calculates the measurement value (for example, an XYZ value, and L*a*b value, or the like) on the basis of the calculated reflectance, and stores the values in the memory 153. In addition, the calibration section 154E updates the printing profile data that is stored in the memory 153 on the basis of the color measurement result of each color patch.

Operational Effects of Present Embodiment

In the present embodiment, the color measurement supplementary unit 18 determines the positional relationship between the media A and the calibration reference object 183 so that the media surface A1 and the calibration surface 184 coincide (substantially coincide) by causing the pressing force plate 181 to abut against the media A. In such a configuration, the media surface A1 and the calibration surface 184 are constantly positioned within the same planar surface regardless of the thickness dimension of the media A. Therefore, when spectroscopic measurement is implemented using the color measurement machine 17, the distance from the color measurement machine 17 up to the calibration surface 184 when performing color measurement of the calibration surface 184, and the distance from the color measurement machine up to the media surface A1 when performing color measurement of the media surface A1, is the same. That is, it is possible to make the measurement conditions for spectroscopic measurement of the calibration surface 184 for acquiring a calibration reference value, and the measurement conditions for spectroscopic measurement of the media surface A1 for acquiring measurement values the same, and therefore, it is possible to implement the color measurement process of the media surface A1 with high accuracy.

In addition, it is possible to suppress rolling, wrinkling, and the like of the media A and rectify the media surface A1 into a planar surface (or a substantially planar surface) by applying a pressing force to the media A using the pressing force plate 181, and therefore, it is possible to more reliably determine the positions of the media surface A1 and the calibration surface 184 on the same planar surface.

In the present embodiment, the calibration surface 184 is caused to abut against the abutting surface 181D of the pressing force plate 181. In this kind of configuration, it is possible to easily bond the calibration surface 184 to the abutting surface 181D using an adhesive agent, or the like, and therefore, it is possible to dispose the calibration surface 184 and the abutting surface 181D within the same planar surface (in positions having the same height) using a simple configuration.

In the present embodiment, it is possible to retain the media A using the platen 122, and therefore, it is possible to suppress rolling and wrinkles, flexing, and the like of the media A. As a result of this, it is possible to reliably align the height positions of the calibration surface 184 and the media surface A1, and therefore, it is possible to improve the color measurement accuracy.

In addition, the accommodation portion 122A is provided in the platen 122, and when the pressing force plate 181 is moved to the abutting position P1, the calibration reference object 183 is accommodated inside the accommodation portion 122A. Therefore, the calibration reference object 183 and the platen 122 do not interfere with one another. In other words, it is possible to cause the abutting surface 181D of the pressing force plate 181 to abut against the media surface A1 while performing retention of the media A using the platen 122.

In the present embodiment, the pressing force plate 181 is provided to be capable of moving between the abutting position P1 and the retreat position P2. Therefore, by moving the pressing force plate 181 to the retreat position P2 during non-measurement in which spectroscopic measurement is not being implemented by the color measurement machine 17, the pressing force plate 181 does not obstruct transport of the media A and printing by the printing portion 16, and therefore, it is possible to implement a transport process and a printing process having high efficiency.

In the present embodiment, when the pressing force plate 181 is moved to the retreat position P2, the lid portion 185, which covers the calibration slit 181F, is provided. Therefore, during non-measurement, the calibration surface 184 is not exposed to the outside, and the calibration surface 184 does not become stained by ink, dust, or the like. Accordingly, it is possible to acquire accurate calibration reference values over a long period of time.

In the present embodiment, the color measurement machine 17 is mounted in the carriage 13, and the carriage 13 is capable of moving in the X direction as a result of the carriage movement unit 14. Therefore, by moving the carriage 13 along the X direction, it is also possible to move the measurement position R of the color measurement machine 17 along the X direction.

Further, in the present embodiment, the calibration slit 181F, through which the calibration reference object 183 is exposed, and the color measurement slit 181E, through which the media surface A1, which is a measurement target, is exposed, are positioned on a movement pathway of the measurement position R of the color measurement machine 17 along the X direction. As a result of this, as a result of moving the color measurement machine 17 in the X direction, it is possible to implement both forms of measurement of the spectroscopic measurement of the media surface A1 and the spectroscopic measurement of the calibration surface 184.

Second Embodiment

Next, a second embodiment according to the invention will be described.

In the first embodiment, an example in which the calibration surface 184 of the calibration reference object 183 is bonded in a state of abutting against the abutting surface 181D of the pressing force plate 181, is shown. In contrast to this, the second embodiment differs from the above-mentioned first embodiment in that the calibration reference object 183 is provided on the platen 122 side.

Figure 10:
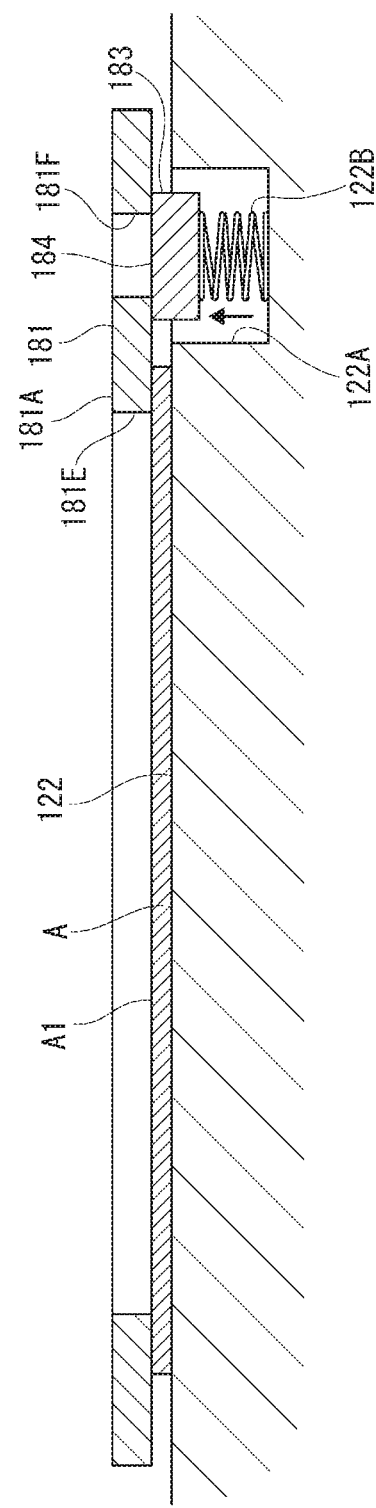
FIG. 10 is a schematic cross-section for describing the disposition of a calibration reference object in a second embodiment.

FIG. 10 is a schematic cross-section for describing the disposition of a calibration reference object in the second embodiment. Additionally, in the following description, the same reference symbol will be given to configurations that have already been described, and description thereof will be omitted of simplified.

In the present embodiment, in the same manner as the first embodiment, the accommodation portion 122A is provided in the platen 122. Further, in the present embodiment, as shown in FIG. 10, the calibration reference object 183 is accommodated in the accommodation portion 122A, and biased against the −Z side (the pressing force plate 181 side) by a biasing section 122B (for example, a spring, or the like).

In this kind of configuration, the calibration surface 184 of the calibration reference object 183 is caused to abut against the abutting surface 181D of the pressing force plate 181 as a result of a biasing force of the biasing section 122B in a state in which the pressing force plate 181 is moved to the abutting position P1. Accordingly, when the abutting surface 181D of the pressing force plate 181 abuts against the media surface A1 of the media A, the positions of the media surface A1 and the calibration surface 184 are determined on the same planar surface. That is, in the present embodiment, the positioning determination section of the invention is configured by the biasing section 122B and the pressing force plate 181.

Figure 11A:
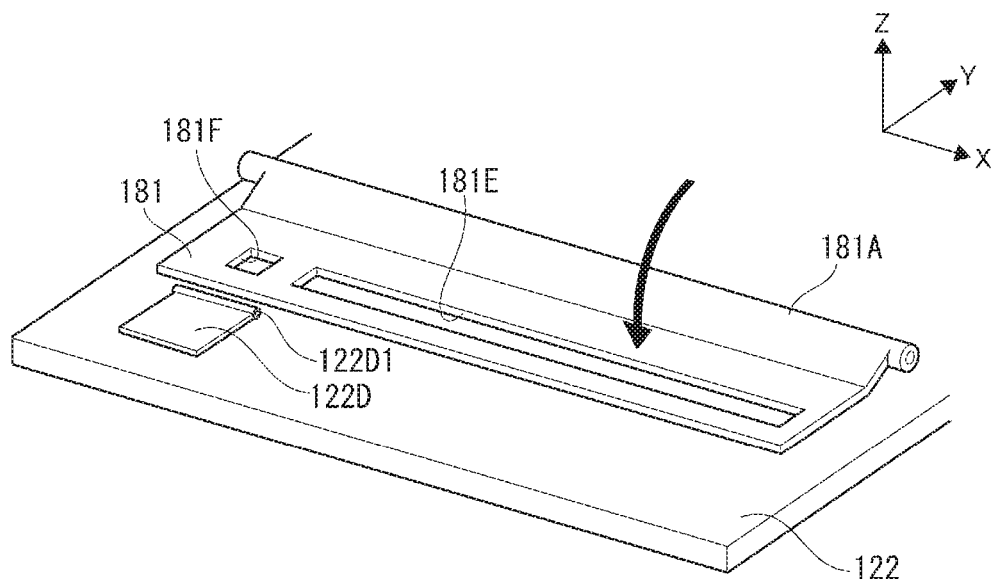
FIGS. 11A and 11B are perspective views of a platen in the second embodiment.
Figure 11B:
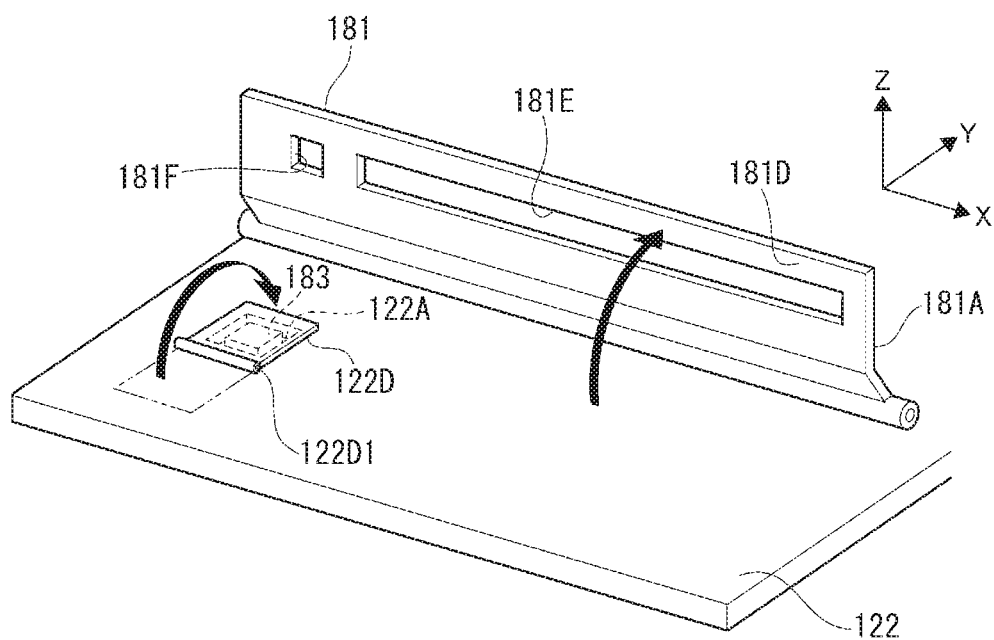

FIGS. 11A and 11B are perspective views of the platen 122 in the second embodiment, FIG. 11A shows a case in which the pressing force plate 181 is in an abutting position, and FIG. 11B shows a case in which the pressing force plate 181 is in a retreat position.

In the present embodiment, as shown in FIGS. 11A and 11B, an accommodation lid portion 122D, which is capable of blocking the accommodation portion 122A, is provided on, for example, the −Y side of the accommodation portion 122A. The accommodation lid portion 122D is capable of rotating with a shaft portion 122D1 as a center thereof, as a result of a driving motor, which is provided separately, for example. In a case in which the pressing force plate 181 is positioned in the abutting position P1, the accommodation lid portion 122D is caused to rotate in a direction of separation from the accommodation portion 122A. As a result of this, the calibration surface 184 of the calibration reference object 183, which is biased away from the accommodation portion 122A by the biasing section 122B, abuts against the abutting surface 181D of the pressing force plate 181.

On the other hand, when the pressing force plate 181 is moved to the retreat position P2, the accommodation lid portion 122D is caused to rotate to the accommodation portion 122A side. As a result of this, a pressing force is applied to the calibration reference object 183 of the accommodation portion 122A by the accommodation lid portion 122D, the calibration reference object 183 is accommodated inside the accommodation portion 122A, and the accommodation lid portion 122D blocks the accommodation portion 122A. As a result of this, the calibration surface 184 is covered by the accommodation lid portion 122D during non-color measurement, and therefore, staining due to ink, dust, or the like is suppressed.

In the present embodiment, the calibration reference object 183 is connected to the accommodation portion 122A of the platen 122 through the biasing section 122B. Further, when the pressing force plate 181 is moved to the abutting position P1, the calibration reference object 183 is biased to the pressing force plate 181 side by the biasing section 122B, and the calibration surface 184 abuts against the abutting surface 181D.

Therefore, the positions of the abutting surface 181D, which is caused to abut against the media surface A1 of the media A, and the calibration surface 184, are determined at the same height position. Accordingly, in the same manner as the above-mentioned first embodiment, it is possible to make the measurement conditions of spectroscopic measurement of the calibration surface 184 for acquiring a calibration reference value, and the measurement conditions of spectroscopic measurement of the media surface A1 for acquiring measurement values the same, and therefore, it is possible to implement the color measurement process of the media surface A1 with high accuracy.

Third Embodiment

Next, a third embodiment according to the invention will be described.

In the above-mentioned first embodiment, an example in which a pressing force is applied to the media A, which is retained by the platen 122, by the pressing force plate 181 to the platen 122 side, and the positions of the abutting surface 181D and the media surface A1 are determined on the same planar surface, is described.

In contrast to this, the third embodiment differs from the above-mentioned first embodiment in that the platen 122 is not provided.

Figure 12:
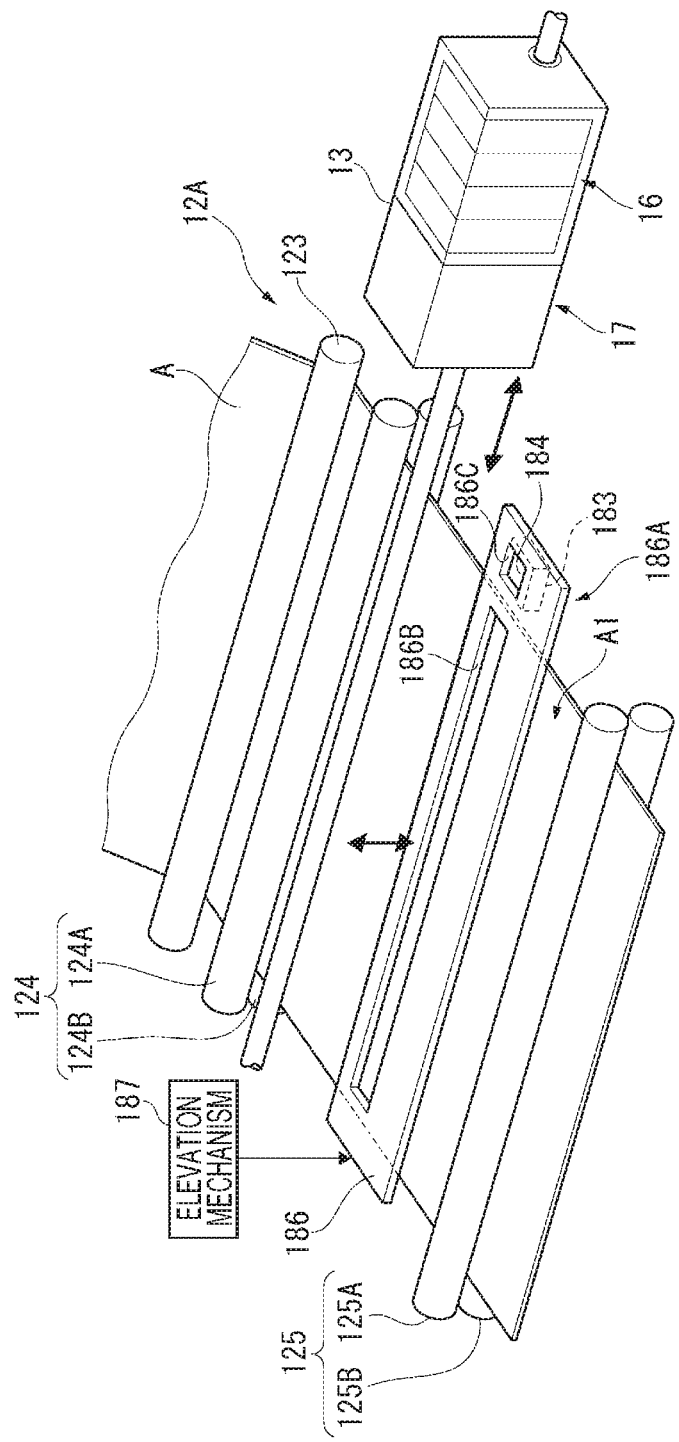
FIG. 12 is a perspective view that shows a schematic configuration of a transport unit, a carriage and an abutting member in a third embodiment.

FIG. 12 is a perspective view that shows a configuration of a transport unit 12A, the carriage 13 and an abutting member 186 in the third embodiment.

As shown in FIG. 12, the transport unit 12A of the present embodiment is provided with a feed-out roller 123, a first pair of rollers 124 and a second pair of rollers 125.

The feed-out roller 123 feeds out the media A, which is supported from the supply unit 11, to a height position at which it is possible to implement the printing process using the printing portion 16 and spectroscopic measurement using the color measurement machine 17.

The first pair of rollers 124 includes a pair of first rollers 124A and 124B, and the media A is clamped and transported to the +Y side by the first rollers 124A and 124B.

The second pair of rollers 125 includes a pair of second rollers 125A and 125B, and the media A is clamped and transported to the +Y side by the second rollers 125A and 125B.

As a result of the media A being clamped by the first pair of rollers 124 and the second pair of rollers 125, the media A is transported in an interval from the first pair of rollers 124 up to the second pair of rollers 125 in a stretched state without flexing.

The carriage 13 is provided in a position that faces the media A, which is transported in an interval from the first pair of rollers 124 up to the second pair of rollers 125. In the same manner as the first embodiment, the carriage 13 is configured to be capable of moving along the X direction as a result of the carriage movement unit 14.

In addition, the abutting member 186, in which approach and separation with respect to the upper surface (the media surface A1) of the media A is possible, is provided in an interval from the first pair of rollers 124 up to the second pair of rollers 125. An elevation mechanism 187 is connected to the abutting member 186, and the abutting member 186 is capable of moving in the Z direction as a result of the elevation mechanism 187.

In the same manner as the pressing portion 181A in the pressing force plate 181 of the first embodiment, the abutting member 186 is formed in a rectangular plate shape that is longitudinal in the X direction, and the lower surface (the surface on the +Z side) thereof corresponds to an abutting surface 186A, which is capable of abutting against the media A. In addition, a color measurement slit 186B which is longitudinal along the X direction, and a calibration slit 186C, which is provided on the −X side of the color measurement slit 186B, are provided in the abutting member 186.

Further, the calibration reference object 183, which covers the calibration slit 186C, is provided on the abutting surface 186A of the abutting member 186. The calibration reference object 183 has the same configuration as that of the first embodiment, and the calibration surface 184 is configured by the upper surface (a surface on the −Z side) thereof. Further, in a state in which the calibration surface 184 is caused to abut against the abutting surface 186A, the calibration surface 184 is bonded to the abutting member 186.

In the present embodiment, during non-measurement, the abutting member 186 is moved to a retreat position (not illustrated in the drawings), which is separated from the media A, as a result of being moved to the −Z side by the elevation mechanism 187. Additionally, in the retreat position, in the same manner as the above-mentioned first embodiment, the lid portion (not illustrated in the drawings), which blocks the calibration slit 186C, is provided, and the calibration surface 184 is protected from ink dust, and the like, as a result of being covered.

In addition, when the spectroscopic measurement is implemented by the color measurement machine 17, the abutting member 186 is moved to the +Z side by the elevation mechanism 187, and the abutting surface 186A is caused to abut against the media surface A1. As a result of this, the positions of the calibration surface 184 and the media surface A1 are determined on the same planar surface (at positions having the same height). Accordingly, in the same manner as the above-mentioned first embodiment, it is possible to implement spectroscopic measurement of the calibration surface 184 and spectroscopic measurement of the media A using the same conditions, and therefore, it is possible to improve the color measurement accuracy.

Other Embodiments

Additionally, the invention is not limited to each of the embodiments mentioned above, and modifications and improvements within a range in which it is possible to achieve the object of the invention, and configurations that are obtained by combining each embodiment as appropriate are also included in the invention.

For example, in the first embodiment, an example in which the calibration slit 181F is provided on the pressing portion 181A, and the calibration reference object 183 is provided on the abutting surface 181D in a manner that covers the calibration slit 181F, is shown, but the invention is not limited to this configuration.

Figure 13A:
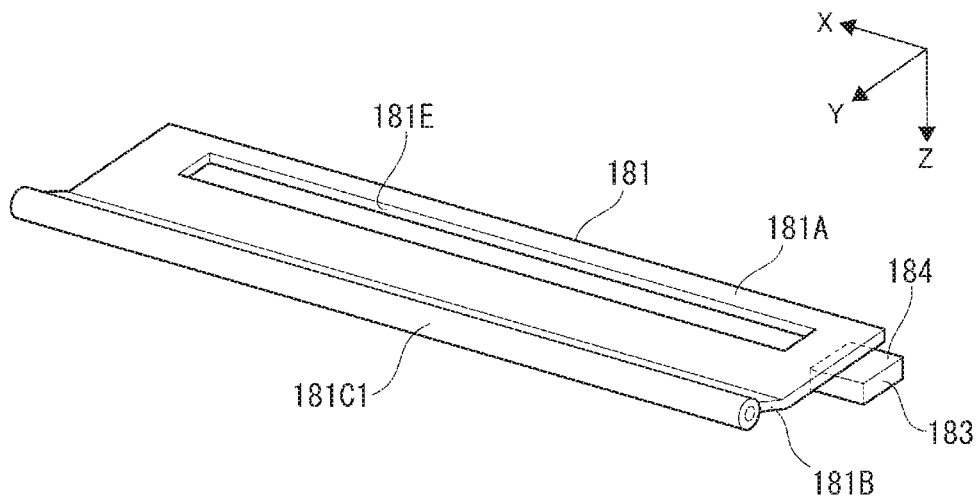
FIGS. 13A and 13B are perspective views that show connection positions of the calibration reference object with respect to a pressing force plate in a modification example.
Figure 13B:
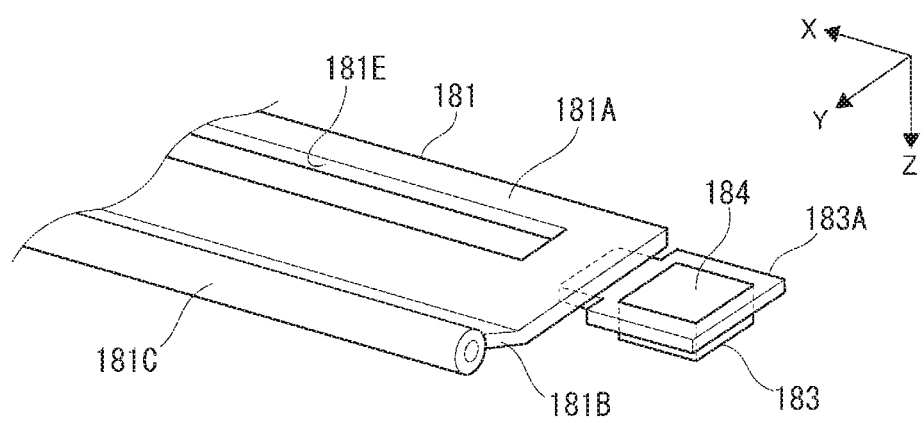

FIGS. 13A and 13B are views that show modification examples of the connection position of the calibration reference object 183 with respect to the pressing force plate 181.

In the example that is shown in FIG. 13A, only the color measurement slit 181E is provided on the pressing portion 181A of the pressing force plate 181, and the calibration slit 181F is not provided. Further, the calibration reference object 183 is provided on the abutting surface 181D of the pressing portion 181A in a manner that protrudes to the −X side from a −X side end portion, for example. In other words, the +X side of the calibration surface 184 of the calibration reference object 183 is bonded to the abutting surface 181D, and the −X side of the calibration surface 184 protrudes from the pressing portion 181A. In this kind of configuration, since the calibration surface 184 and the abutting surface 181D are also included within the same planar surface, the positions of the calibration surface 184 and the media surface A1 are determined within the same planar surface as a result of causing the abutting surface 181D to abut against the media surface A1. Accordingly, in the same manner as each of the above-mentioned embodiments, it is possible to make the measurement conditions the same in spectroscopic measurement of the calibration surface 184 and spectroscopic measurement of the media surface A1, and therefore, an improvement in color measurement accuracy is achieved.

In addition, in the example of FIG. 13B, in the same manner as FIG. 13A, the calibration slit 181F is not provided, and a protruding retaining portion 183A, which retains the calibration reference object 183, is provided in a manner that protrudes to the −X side from the −X side end portion of the pressing portion 181A. The protruding retaining portion 183A returns the calibration reference object 183 in a manner in which the calibration surface 184 of the calibration reference object 183 is positioned within the same planar surface as the abutting surface 181D of the pressing portion 181A. In this kind of configuration, in the same manner as FIG. 13A and each of the above-mentioned embodiments, the positions of the calibration surface 184 and the media surface A1 are determined within the same planar surface as a result of causing the abutting surface 181D to abut against the media surface A1, and therefore, an improvement in color measurement accuracy is achieved.

Additionally, in the calibration of FIGS. 13A and 13B, since the calibration slit 181F is not provided, a configuration in which it is easy for outside light to be incident to the calibration surface 184 is formed. Accordingly, it is preferable that a separate light-shielding portion is provided in order to suppress the incidence of outside light.

In addition, in the above-mentioned first embodiment, an example in which the calibration surface 184 abuts against the abutting surface 181D, or in other words, in which the positions of the calibration surface 184 and the abutting surface 181D are determined to be positions having the same height, is shown, but the invention is not limited to this configuration. For example, as shown in FIG. 14, a configuration in which a retaining portion 183B, which retains the calibration reference object 183 below the calibration slit 181F, is provided on the abutting surface 181D of the pressing portion 181A, and a predetermined gap is provided between the calibration surface 184 and the abutting surface 181D (a configuration in which the height positions differ), may also be used.

In this case, in a case in which the abutting surface 181D is caused to abut against the media surface A1, the height positions of the media surface A1 and the calibration surface 184 differ, and are not on the same planar surface. However, the difference (the difference in height) in the height positions of the media surface A1 and the calibration surface 184 is constant regardless of the thickness dimension of the media A. Therefore, the inconvenience of the color measurement result varying depending on the type of the media A is suppressed, and it is also possible to obtain the color measurement results having the same measurement accuracy for all media A.

Additionally, in FIGS. 13A to 14, the pressing force plate 181 is illustrated by way of example, but the same applies to the abutting member 186 that is shown in the third embodiment.

In the second embodiment, an example in which the calibration reference object 183 is biased to the −Z side by the biasing section 122B into the accommodation portion 122A of the platen 122, and the calibration surface 184 is caused to abut against the abutting surface 181D of the pressing force plate 181, is shown, but the invention is not limited to this configuration.

FIG. 15 is a schematic view that shows a modification example of the second embodiment.

In the example that is shown in FIG. 15, the calibration reference object 183 is accommodated in the accommodation portion 122A, and the calibration reference object 183 is capable of being elevated by an elevation mechanism 122C. In this kind of configuration, the calibration surface 184 is caused to abut against the abutting surface 181D of the pressing force plate 181 as a result of controlling the elevation mechanism 122C. Therefore, similar operational effects to those of each of the above-mentioned embodiments are obtained, and it is possible to determine the positions of the media surface A1 and the calibration surface 184 as the same height positions (within the same planar surface) as a result of the media surface A1 being caused to abut against the abutting surface 181D.

In addition, the examples that are shown in the above-mentioned second embodiment and FIG. 15 are configurations that cause the calibration surface 184 to abut against the abutting surface 181D of the pressing force plate 181, but the invention is not limited to this configuration. For example, a configuration such as that shown in FIG. 16, may also be used.

Figure 16:
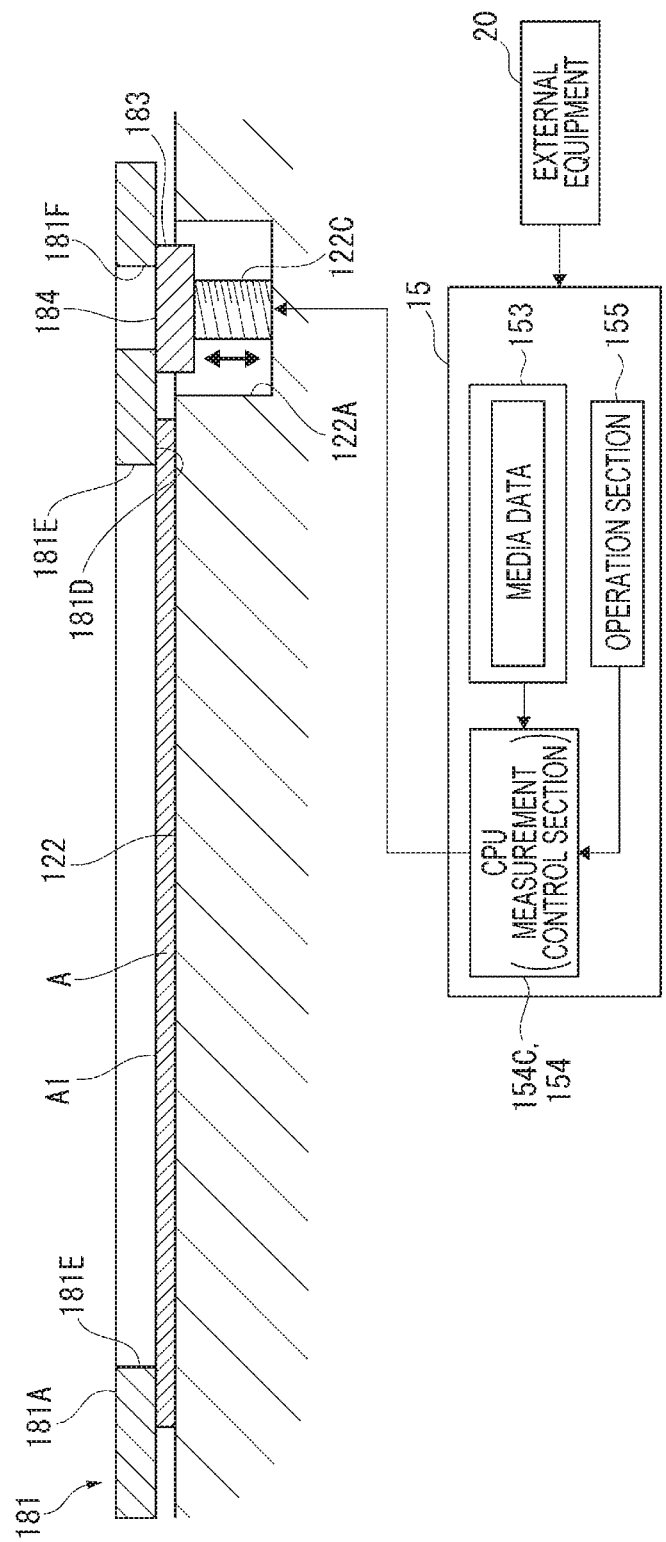
FIG. 16 is a schematic cross-sectional view that shows another modification example of the second embodiment.

In the example that is shown in FIG. 16, in the same manner as FIG. 15, the calibration reference object 183 is configured to be capable of being elevated by the elevation mechanism 122C. In addition, in the present example, in an initial state (non-measurement), the calibration surface 184 of the calibration reference object 183 is positioned in a predetermined reference position. For example, in an initial state, the calibration surface 184 is set so as to be positioned on the same planar surface as the upper surface of the platen 122.

Further, media data in which a type of the media A, and a thickness dimension of the media A are associated is stored in the memory 153 of the control unit 15, and the measurement control section 154C determines the type of the media A, reads the thickness dimension that corresponds to the media A from media data, and elevates (moves to the −Z side) the calibration surface 184 by driving the elevation mechanism 122C by an amount that is equivalent to the thickness dimension that is read. Additionally, for example, the type of the media may be input as a result of the operation portion 155, which is provided in the printer 1, being operating by a user, or may be input from external equipment (a personal computer, or the like). In addition, the type of the media A may be determined using an optical sensor, or the like. For example, the type of the media A may be determined on the basis of the spectroscopic spectrum by performing spectroscopic measurement of a region of the media surface A1 in which an image is not formed using the color measurement machine 17.

Furthermore, the media data need not necessarily be stored in the memory 153. For example, in this case, a measuring sensor that measures the thickness dimension of the media A is provided. For example, an optical type distance sensor, which faces the platen 122, is provided as a measuring sensor, and the distance from the corresponding distance sensor up to the platen 122 is measured. When the media A is transported to the platen 122, since the distance that is measured by the distance sensor is decreased by an amount that is equivalent to the thickness dimension of the media A, the decreased amount is calculated and set as the thickness dimension of the media A. Further, the calibration reference object 183 is raised (moved to the −Z side) by an amount that is equivalent to the calculated thickness dimension of the media A.

In addition, in the abovementioned manner, in a configuration in which the calibration reference object 183 is raised on the basis of the thickness dimension of the media A that is measured by media data, a measuring sensor, or the like, the pressing force plate 181 need not necessarily be provided.

Additionally, in the above-mentioned examples, the reference position of the calibration surface 184 is set to be the same height position as the upper surface of the platen 122, but for example, a position in which the calibration reference object 183 is lowered furthest on the −Z side by the elevation mechanism 122C may be set as a reference position. In this case, the difference in height (a reference difference in height) between the calibration surface 184 and the upper surface of the platen 122 in that position is measured in advance, and it is possible to determine the positions of the calibration surface 184 and the media surface A1 on the same planar surface by adding the reference difference in height to a thickness dimension that corresponds to the type of media.

In addition, even in a case in which there is a reference difference in height, a configuration that raises the calibration reference object 183 by an amount that is equivalent to a thickness dimension that corresponds to the type of media, may also be used. In this case, although the media surface A1 and the calibration surface 184 have different height positions, since it is possible to make the difference in height between the media surface A1 and the calibration surface 184 constant (a reference difference in height) regardless of the type of the media A, it is possible to suppress variations in the color measurement results depending on the type of media.

Figure 17A:
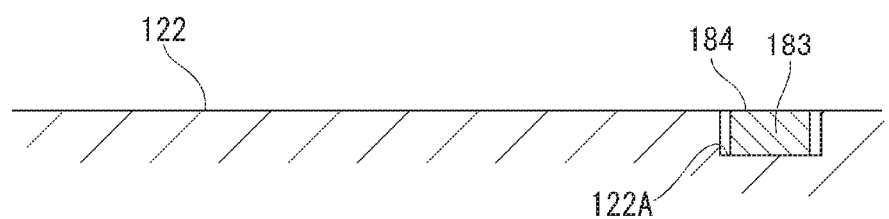
FIGS. 17A and 17B are schematic cross-sectional views that show still another modification example of the second embodiment.
Figure 17B:
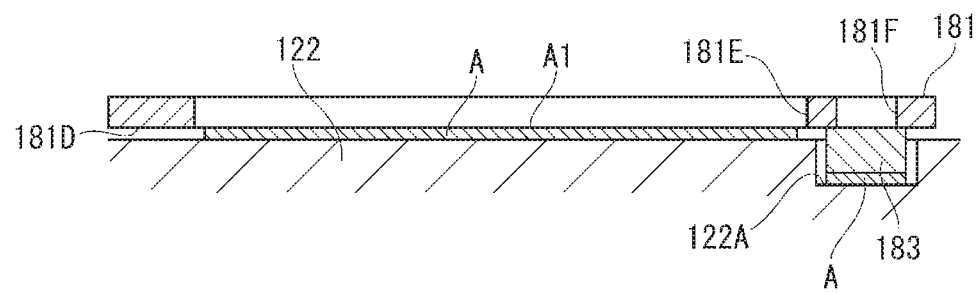

Furthermore, the invention is not limited to a configuration in which the calibration reference object 183, which is provided on the platen 122 side, is biased to the −Z side by the biasing section 122B, and a configuration in which the calibration reference object 183 is raised by the elevation mechanism 122C, and configurations such as those shown in FIGS. 17A and 17B, may also be used. FIGS. 17A and 17B are schematic views that show other modification examples of the second embodiment.

In the examples that are shown in FIGS. 17A and 17B, in the same manner as the second embodiment, the platen 122 includes the accommodation portion 122A, and the calibration reference object 183 is mounted on the bottom surface of the accommodation portion 122A. It is preferable that the depth dimension of the accommodation portion 122A is the same as the height dimension of the calibration reference object 183, and the height positions of the calibration surface 184 and the upper surface of the platen 122 are the same.

In this kind of configuration, when the color measurement process on the media A is implemented, a cut end of a media A of the same type as the media A that is set on the platen 122 is clamped between the calibration reference object 183 and the bottom surface of the accommodation portion 122A. In a case in which the calibration surface 184 and the upper surface of the platen 122 have the same height positions, the positions of the media surface A1 of the media A that is set on the platen 122 and the calibration surface 184 are determined on the same planar surface as a result of the above-mentioned operation. Accordingly, in the same manner as the above-mentioned embodiment, it is possible to implement a color measurement process having high accuracy.

In the first embodiment, an example in which the accommodation portion 122A was provided in the platen 122 is illustrated by way of example, but the invention is not limited to this configuration. For example, in a case in which the thickness dimension of the calibration reference object 183 is smaller than a minimum value of the thickness dimension of the media A that can be set in the printer 1, a configuration in which the accommodation portion 122A is not provided, may also be used.

In the first embodiment, a configuration in which the pressing force plate 181 is capable of moving between the abutting position and the retreat position, is illustrated by way of example, but the invention is not limited to this configuration. For example, in the manner of the third embodiment, a configuration in which the pressing force plate 181 is elevated along the Z direction, may also be used. In addition, a configuration that clamps the media A using the pressing force plate 181 and the platen 122 as a result of the platen 122 being elevated using an elevation function, may also be used. In this case, a configuration in which the pressing force plate 181 is fixed to a predetermined position, may also be used.

An example in which the measurement position R of the color measurement machine 17 moves in the X direction in accordance with movement of the carriage 13, is shown, but the invention is not limited to this configuration. For example, a configuration in which the color measurement machine 17 is capable of moving along the two directions of the X direction and the Y direction, may also be used. In this case, the calibration reference object 183 may be provided on a line that differs from a line of a color measurement position of the media A. That is, a color measurement position of the media surface A1 and a color measurement position of the calibration surface 184 may be deviate in the Y direction. In this case, it is sufficient as long as the color measurement slit 181E and the calibration slit 181F are provided to correspond to the respective color measurement positions.

In each of the above-mentioned embodiments, a configuration in which the carriage 13 is moved in the X direction by the carriage movement unit 14, is shown, but the invention is not limited to this configuration. For example, by transports the media A in the X direction, a printing position by the printing portion 16 and a color measurement position by the color measurement machine 17 may be relatively moved in the X direction. The same applies to the Y direction, and for example, a configuration in which the carriage 13 is moved in the Y direction, may also be used.

In addition, the specific structures when implementing the invention may be configured by combining as appropriate each of the above-mentioned embodiments and modification examples within a range in which it is possible to achieve the object of the invention, and may also be altered to other structures, and the like, as appropriate.

The entire disclosure of Japanese Patent Application No. 2015-179715, filed Sep. 11, 2015 is expressly incorporated by reference herein.

What is claimed is:

1. A color measurement device comprising:
   a calibration reference object having a calibration surface;
   a position determination member that is provided directly adjacent to the calibration reference object, the position determination member including an abutting member, an abutting surface of the abutting member abutting a first surface of a medium; and
   a support that retains the medium, the support having an accommodation area that accommodate the calibration reference object when the abutting surface abuts the first surface of the medium,
   wherein the position determination member is configured to determine a relative position of the first surface of the medium and the calibration surface when the abutting surface abuts the first surface of the medium.

2. The color measurement device according to claim 1, wherein the abutting member is configured to apply a pressing force to the first surface of the medium when the abutting surface abuts the first surface of the medium.

3. The color measurement device according to claim 1, wherein the calibration reference object is connected to the abutting member.

4. The color measurement device according to claim 3, wherein the calibration reference object is connected to a position in which the calibration surface and the abutting surface are on a same planar surface.

5. The color measurement device according to claim 4, wherein the calibration surface partially abuts against the abutting surface.

6. The color measurement device according to claim 1, wherein the abutting member is movably located between an abutting position in which the abutting surface abuts against the first surface of the medium and a retreat position that is different from the abutting position.

7. The color measurement device according to claim 6, further comprising:
a lid that covers the calibration surface when the abutting member is positioned in the retreat position.

8. The color measurement device according to claim 1, wherein the calibration reference object is connected to the support.

9. The color measurement device according to claim 8, wherein the position determination member includes a biasing member that causes the calibration surface partially abut against the abutting surface by biasing the calibration reference object against a side of the abutting member.

10. The color measurement device according to claim 1, further comprising:
a color measurement component that is configured to perform color measurement of the medium; and
a movement mechanism that relatively moves the color measurement component in one direction with respect to the medium.

11. The color measurement device according to claim 10, wherein the calibration reference object is provided in a relative movement pathway of the color measurement-component.

12. The color measurement device according to claim 11, wherein the abutting member is provided in the relative movement pathway,
wherein the calibration reference object is provided on the abutting member at a first side of the abutting surface,
wherein the color measurement component is positioned on a second side which is opposite to the first side, of the abutting surface, and
wherein the abutting member is provided with a color measurement slit for the color measurement of the medium, and a calibration slit for the color measurement of the calibration surface, and the color measurement slit and the calibration slit are provided along the one direction.

13. A printing apparatus comprising:
the color measurement device according to claim 1; and
an image-forming portion that forms images on the medium.

14. A printing apparatus comprising:
the color measurement device according to claim 2; and
an image-forming portion that forms images on the medium.

15. A printing apparatus comprising:
the color measurement device according to claim 3; and
an image-forming portion that forms images on the medium.

16. A printing apparatus comprising:
the color measurement device according to claim 4; and
an image-forming portion that forms images on the medium.

17. A color measurement device comprising:
a calibration reference object having a calibration surface; and
a position determination member that is provided directly adjacent to the calibration reference object,
wherein the position determination member is configured to determine a relative position of a first surface of a medium and the calibration surface,
wherein the position determination member includes a support that retains a second surface, which is opposite to the first surface, of the medium, and
the calibration reference object is connected to the support.

18. The color measurement device according to claim 17, wherein the position determination member includes a biasing member that causes the calibration surface partially abut against the abutting surface by biasing the calibration reference object against a side of the abutting member.

19. A color measurement device comprising:
a calibration reference object having a calibration surface; and
a position determination member that is provided directly adjacent to the calibration reference object, the position determination member including an abutting member, an abutting surface of the abutting member abutting a first surface of a medium,
wherein the abutting member is movably located between an abutting position in which the abutting surface abuts against the first surface of the medium and a retreat position that is different from the abutting position.

20. The color measurement device according to claim 19, further comprising:
a lid that covers the calibration surface when the abutting member is positioned in the retreat position.

* * * * *